United States Patent
Nishihara et al.

(10) Patent No.: US 10,241,460 B2
(45) Date of Patent: Mar. 26, 2019

(54) IMAGE FORMING APPARATUS

(71) Applicant: CANON KABUSHIKI KAISHA, Tokyo (JP)

(72) Inventors: Hiroto Nishihara, Tsukuba (JP); Shinnosuke Iwadate, Toride (JP); Teruhito Kai, Kashiwa (JP); Hiromi Shimura, Toride (JP); Keita Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/610,408

(22) Filed: May 31, 2017

(65) Prior Publication Data
US 2017/0357204 A1 Dec. 14, 2017

(30) Foreign Application Priority Data
Jun. 9, 2016 (JP) ................. 2016-115522

(51) Int. Cl.
*G03G 15/00* (2006.01)
*G03G 15/20* (2006.01)
*H04N 1/00* (2006.01)

(52) U.S. Cl.
CPC ......... *G03G 15/80* (2013.01); *G03G 15/2028* (2013.01); *G03G 15/2032* (2013.01); *G03G 15/5004* (2013.01); *H04N 1/00891* (2013.01); *H04N 1/00896* (2013.01)

(58) Field of Classification Search
CPC ............. G03G 15/2032; G03G 15/205; G03G 15/5004
See application file for complete search history.

(56) References Cited

FOREIGN PATENT DOCUMENTS

| JP | 06019344 A | * | 1/1994 | |
|----|------------|---|--------|---|
| JP | 07334027 A | * | 12/1995 | |
| JP | 2000-122460 A | | 4/2000 | |
| JP | 2008304866 A | * | 12/2008 | ......... G03F 15/2032 |
| JP | 2009-58664 A | | 3/2009 | |

* cited by examiner

*Primary Examiner* — Erika J Villaluna
(74) *Attorney, Agent, or Firm* — Canon U.S.A., Inc. IP Division

(57) ABSTRACT

An image forming apparatus including a normal power mode and a power saving mode includes a fixing unit configured to bring first and second rotary members into contact with each other to form a nip portion and fix a toner image onto a sheet with a pressing force of the nip portion. The image forming apparatus executes a rotation operation or a separation operation to separate the first and second rotary members from each other in order to prevent a deformation of the nip portion in the fixing unit. The image forming apparatus measures a time during which the first and second rotary members are in contact with each other without rotating. The image forming apparatus determines whether to execute the separation operation or the rotation operation based on a result of the power mode determination and the measured time.

20 Claims, 14 Drawing Sheets

FIG.8

| POWER MODE | REMOTE SIGNAL 1 | REMOTE SIGNAL 2 |
|---|---|---|
| NORMAL MODE | HIGH | HIGH |
| POWER SAVING MODE | HIGH | LOW |
| POWER OFF MODE | LOW | LOW |

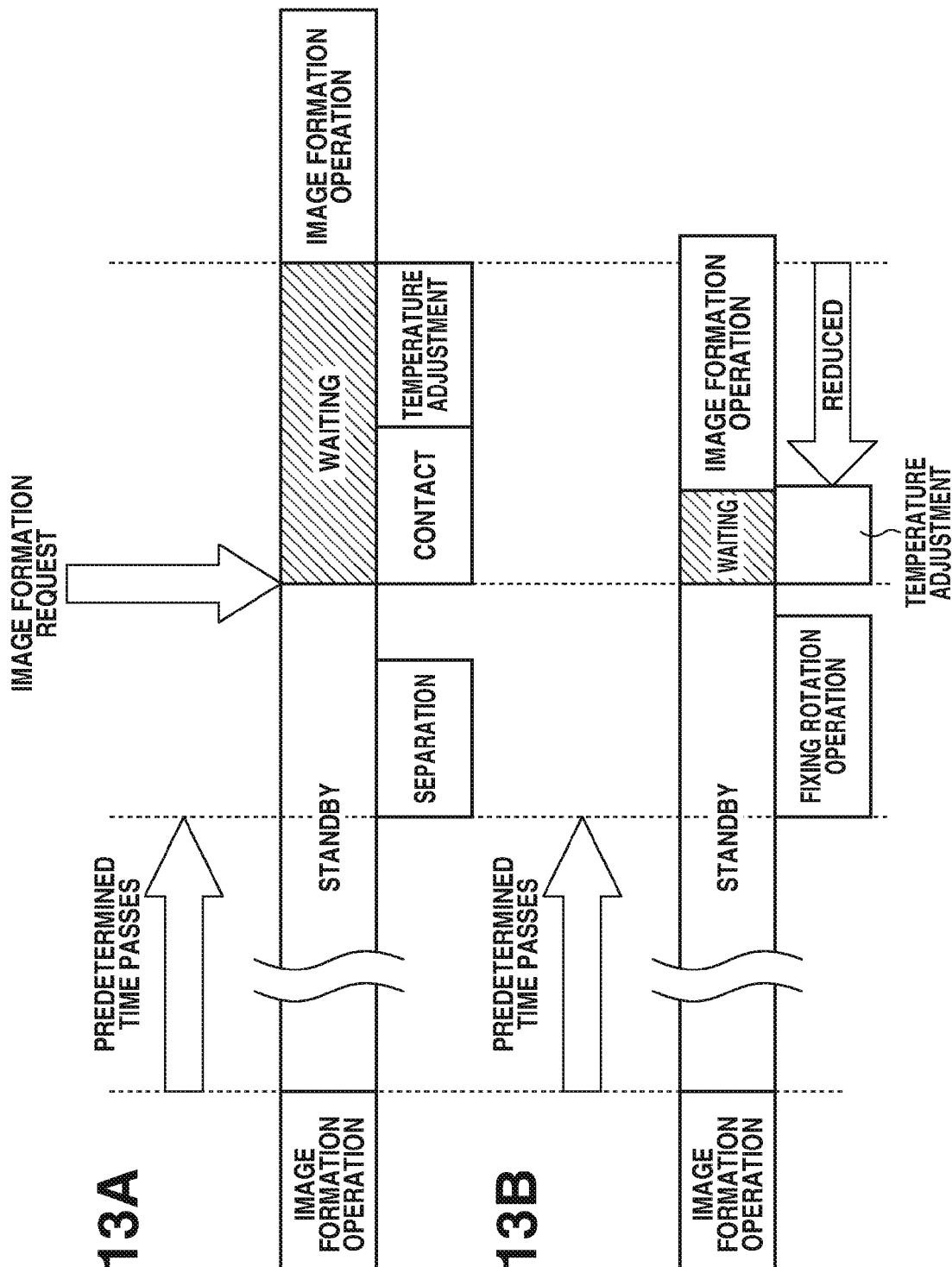

IMAGE FORMING APPARATUS

BACKGROUND

Field of Art

The present disclosure relates to image forming apparatuses configured to form images.

Description of the Related Art

An electrophotographic image forming apparatus includes a fixing device configured to fix a toner image transferred onto a sheet. The fixing device fixes the toner image with heat and pressure using a fixing member which includes a heat source and a pressing member which is pressed against the fixing member.

In recent years, an increasing number of image forming apparatuses employ a film-heating fixing device for prompt activation and energy conservation. The film-heating fixing device includes a ceramic heater as a heating member and a pressing roller as a pressing member, and a fixing film as a heat transmission member is sandwiched between the ceramic heater and the pressing roller to form a pressure nip portion. Then, a sheet onto which an unfixed toner image is transferred is introduced and nipped and conveyed to fix the unfixed toner image onto the sheet with pressing force of the pressure nip portion while heat of the ceramic heater is applied via the fixing film.

In the fixing device, if the fixing film and the pressing roller are in contact with each other for a long time, components of the fixing film and the pressing roller can be deformed, which can cause an image failure such as image unevenness. A known method for preventing such an image failure is to execute control such that the fixing member and the pressing member are separated when no operation of forming an image is executed. Japanese Patent Application Laid-Open No. 2000-122460 discusses an image forming apparatus including a mechanism for separating a fixing member and a pressing member. The image forming apparatus executes a separation operation using the mechanism to separate the fixing member and the pressing member from each other at a predetermined timing, such as a timing at which an image-forming state is changed to a non-image-forming state or a timing at which a jam is caused. In this way, the above-described image failure associated with deformation of the fixing member is prevented. Further, Japanese Patent Application Laid-Open No. 2009-58664 discusses a method in which a separation operation is performed if a predetermined time passes since the end of an image formation operation.

The image forming apparatus discussed in Japanese Patent Application Laid-Open No. 2009-58664 executes a fixing separation operation uniformly regardless of the state of the apparatus after the predetermined time passes since the end of the image formation operation. Thus, for example, the following problem can arise.

Suppose that, for example, the image forming apparatus is in a standby state when the predetermined time passes since the end of the image formation operation. Being in the standby state indicates that the entire apparatus is standing by for a start of image formation. While the entire apparatus is standing by for a start of image formation, if the fixing member and the pressing member of the fixing device are separated, a preparation operation for changing from the separated state to a contact state is needed, and this becomes a bottleneck that delays a start of image formation. As a result, the first copy output time (FCOT) is increased.

SUMMARY

The present disclosure is directed to a technique for determining the state of an apparatus at a time point at which a predetermined time passes, and controlling a fixing device as appropriate according to a result of the determination.

According to an aspect of an embodiment, an image forming apparatus including as power modes, a first power mode and a second power mode in which power consumption is lower than power consumption in the first power mode includes an image bearing member, an image forming unit configured to form a toner image on the image bearing member when an image formation request is received, a transfer unit configured to transfer onto a sheet the toner image formed on the image bearing member, a fixing unit including a first rotary member and a second rotary member and configured to bring the first rotary member and the second rotary member into contact with each other to form a nip portion and fix onto the sheet the toner image transferred by the transfer unit with a pressing force of the nip portion while applying heat via the first rotary member, a first execution unit configured to execute a rotation operation to rotate the first rotary member and the second rotary member, a second execution unit configured to execute a separation operation to separate the first rotary member and the second rotary member from each other, and a determination unit configured to determine whether a predetermined time passes while the first rotary member and the second rotary member are in contact with each other without rotating, wherein the first execution unit executes the rotation operation in a case where the determination unit determines that the predetermined time passes and the image forming apparatus is in the first power mode, whereas the second execution unit executes the separation operation in a case where the determination unit determines that the predetermined time passes and the image forming apparatus is in the second power mode.

According to an aspect of an embodiment, the state of an apparatus at a time point at which a predetermined time passes is determined, and a fixing device is controlled as appropriate according to a result of the determination.

Features of the present invention will become apparent from the following description of exemplary embodiments with reference to the attached drawings.

BRIEF DESCRIPTION OF THE DRAWINGS

FIG. 8 is an association chart of power modes and remote signals 1 and 2.

FIGS. 13A and 13B illustrate an advantage of an exemplary embodiment.

DESCRIPTION OF THE EMBODIMENTS (Schematic Configuration of Image Forming System)

Figure 1:
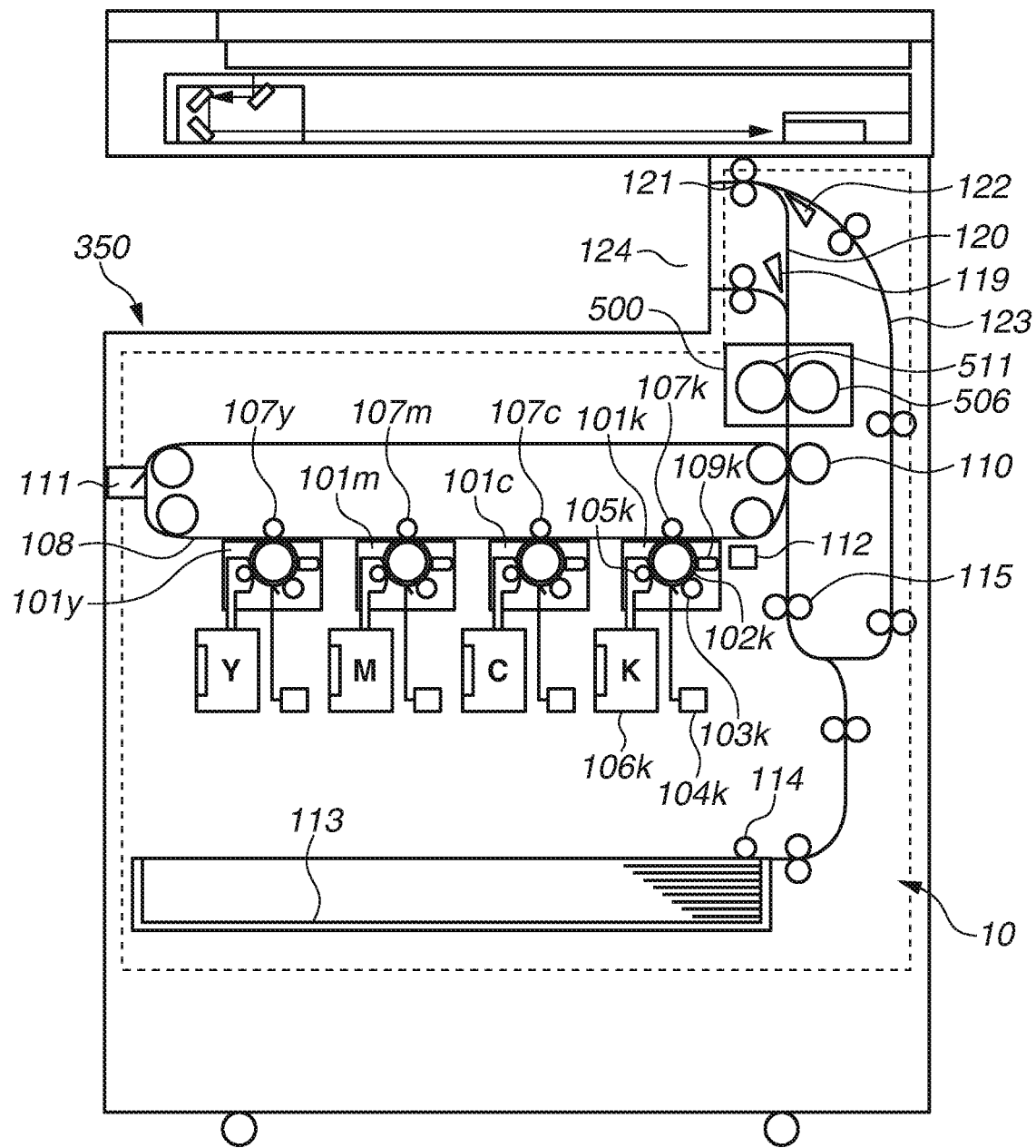
FIG. 1 is a cross sectional view illustrating a main body of an image forming apparatus.

An exemplary embodiment will be described below with reference to the drawings. FIG. 1 is a cross sectional view illustrating an entire image forming apparatus 350.

The image forming apparatus 350 includes a printer unit 10. The printer unit 10 includes a black processing unit 101k, a yellow processing unit 101y, a magenta processing unit 101m, and a cyan processing unit 101c, each of which includes a photosensitive drum, which is an image bearing member, a development unit, and a charging roller. In a central portion of the black processing unit 101k, the photosensitive drum (image bearing member) 102k is provided, which is rotated and driven by a drum motor (not illustrated). The charging roller 103k applies high voltage to uniformly charge a surface of the photosensitive drum (image bearing member) 102k. A laser scanner unit (image forming unit) 104k performs scanning in a lengthwise direction with a laser beam modulated and output from a laser diode using a polygon mirror rotary member. The laser scanner unit 104k performs laser exposure according to input image information to form an electrostatic latent image on the uniformly charged photosensitive drum (image bearing member) 102k. The development unit 105k forms on the photosensitive drum 102k a visible toner image according to the electrostatic latent image with a two-component developing agent including toner and carrier. A toner bottle 106k contains the toner and supplies the toner to the development unit 105k. A primary transfer roller 107k performs primary transfer from the photosensitive drum 102k onto an intermediate transfer member 108, which is an endless belt member for sequentially transferring and superimposing yellow, magenta, cyan, and black toners. An auxiliary charging brush 109k charges residual toner that is not successfully transferred onto the primary transfer roller 107k such that the residual toner is uniformly charged. While only the photosensitive drum 102k, the charging roller 103k, the development unit 105k, and the auxiliary charging brush 109k included in the processing unit 101k for black are described above, the processing units 101y, 101m, and 101c, image bearing members 102y, 102m, and 102c, charging rollers 103y, 103m, and 103c, development units 105y, 105m, and 105c, and auxiliary charging brushes 109y, 109m, and 109c for yellow, magenta, and cyan are similar to those for black. Hereinafter, the terms "photosensitive drum 102", "charging roller 103", "development unit 105", and "auxiliary charging brush 109" refer to those for yellow, magenta, cyan, and black.

The toner image transferred by the primary transfer onto the intermediate transfer member 108 is transferred by secondary transfer by a secondary transfer roller 110, which is a transfer unit, onto a sheet. Residual toner that is not successfully transferred by the transfer unit (secondary transfer roller 110) and a toner image for image quality adjustment that should not be transferred onto the sheet are cleaned by an intermediate transfer member cleaner 111. A pattern density detection sensor 112 detects a change in density of a pattern formed on the intermediate transfer member 108. A result of the detection is provided as feedback to the development unit 105 and the laser scanner unit 104 and used in image quality adjustment.

A sheet cassette 113 is a container portion for storing sheets. In transferring the toner image onto a sheet stored in the sheet cassette 113, the sheet is fed by a sheet feeding roller 114 at a timing at which a front edge of the toner image meets a front edge of the sheet. Thereafter, an inclined orientation of the sheet is adjusted by a registration roller 115 and then the sheet is sent to the secondary transfer roller 110.

A fixing device 500 is a device for fixing an unfixed toner image onto the sheet. The fixing device 500 may be configured to act as a fixing unit. More generally, a fixing unit is an apparatus that fixes an image onto an image substrate such as a sheet. A typical fixing unit may use heat and/or pressure to fix an image made of toner onto a sheet. The fixing device 500 includes a fixing film unit 511, which is a first rotary member, and a pressing roller 506, which is a second rotary member, and fixes the toner image with heat onto the sheet onto which the toner image is transferred by the secondary transfer roller 110. Specifically, the fixing device 500 brings the fixing film unit 511 and the pressing roller 506 into contact with each other to form a nip portion. Then, while applying heat through the fixing film unit 511, the fixing device 500 fixes the toner image onto the sheet with the pressing force of the nip portion.

The sheet having passed through the fixing device 500 is conveyed in a direction that is changed by a conveyer flapper 119. In a case of one-sided printing, the sheet is conveyed to a sheet discharging unit 124. In a case of two-sided printing, the sheet is conveyed to a two-sided printing reversal path 120. The sheet conveyed to the two-sided printing reversal path 120 is conveyed to the registration roller 115 through a two-sided printing sheet conveyance path 123 by a reversal roller 121 and a reversal flapper 122, and an image is formed on the back side of the sheet. Then, the sheet is conveyed to the sheet discharging unit 124.

(Power Source Configuration)

Figure 2:
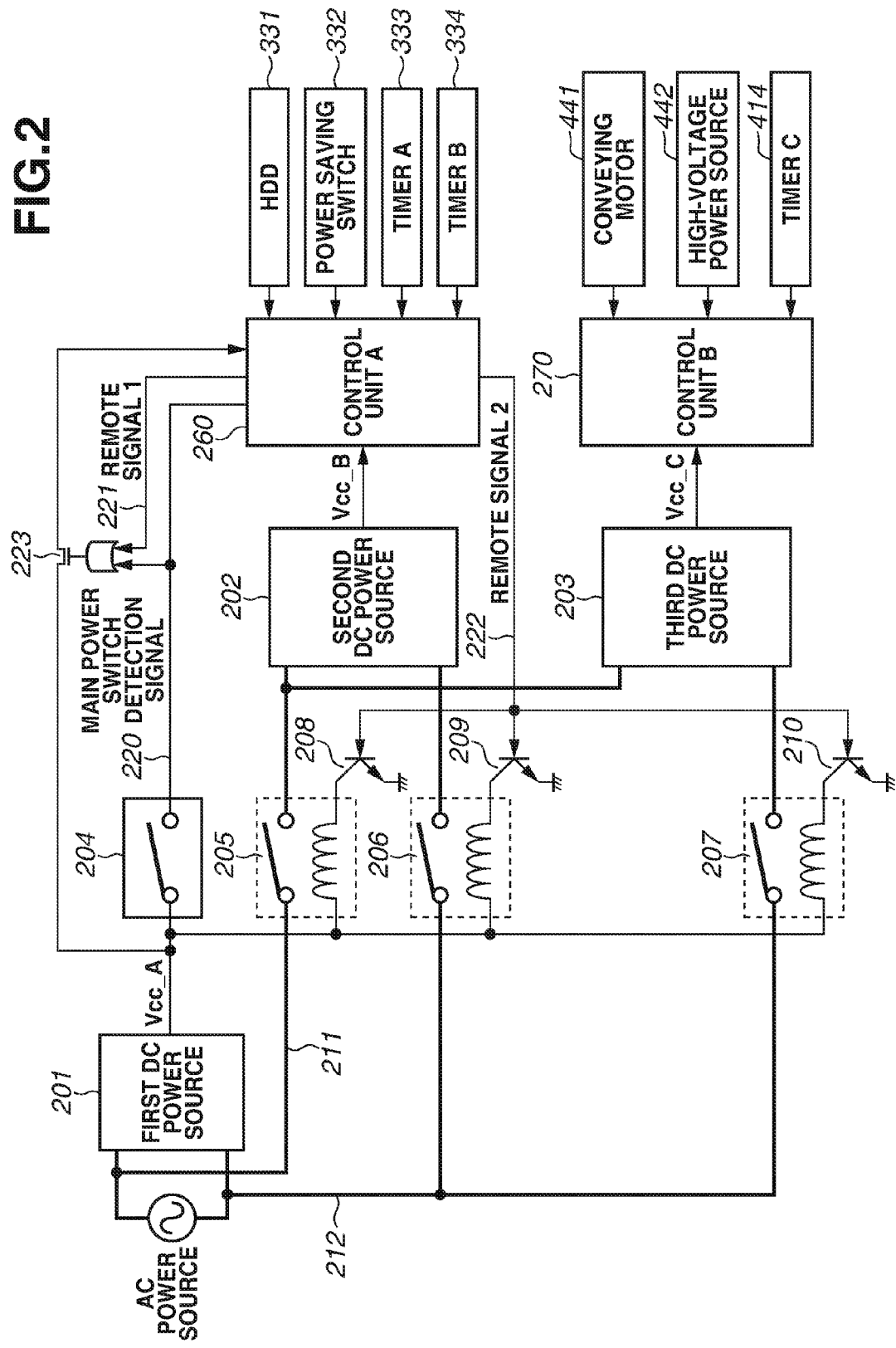
FIG. 2 illustrates a configuration of power sources of the image forming apparatus.

FIG. 2 illustrates a power source configuration of the image forming apparatus 350. The following describes how power is supplied to each load in the image forming apparatus 350, with reference to the power source configuration illustrated in FIG. 2.

A first direct-current (DC) power source 201 is a power source unit configured to generate DC power from commercial alternating-current (AC) power, and supplies power VCC_A (e.g., 3.3 V) to a control unit A 260. A power line for the power VCC_A is connected to one terminal of a main power switch 204. Further, the other one of the terminals of the main power switch 204 is connected to the control unit A 260 via a signal line for a main power switch detection signal 220.

A second DC power source 202 is a power source unit configured to generate power VCC_B (e.g., DC 12 V), which is supplied to the control unit A 260, a hard disk drive (HDD) 331, etc. Power is supplied to the second DC power source 202 through a first AC power supply line 211 via a first relay 205 and a second power supply line 212 via a second relay 206.

A third DC power source 203 is a power source unit configured to generate power VCC_C (e.g., DC 24 V), which is supplied to a conveying motor 441, which rotates and drives driving units in the image forming apparatus 350, a high-voltage power source 442, which supplies high-voltage power, a timer C 414, etc. Power is supplied to the third DC power source 203 through the first AC power supply line 211 via the first relay 205 and the second power supply line 212 via a third relay 207.

(Description of Time when Main Power Switch is Turned on)

First, the following describes operations performed when a user manually operates the main power switch 204 to change the image forming apparatus 350 being in a power off mode to a normal mode (first power mode).

When the main power switch 204 is off, the power mode of the image forming apparatus 350 is the power off mode as illustrated in FIG. 8. In the power off mode, no power VCC_A is supplied to the control unit A 260, and remote signals 1 (221) and 2 (222) output from the control unit A 260 are both at a low-level.

When the main power switch 204 is manually operated, the image forming apparatus 350 is changed to the normal mode (first power mode). In the normal mode (first power mode), a start of image formation is awaited (the mode is also referred to as "standby state"), and power is supplied to all blocks illustrated in FIG. 2 including at least the fixing device 500, the control unit A 260, and a control unit B 270.

A field-effect transistor (FET) 223 supplies the power VCC_A to the control unit A 260 if the power VCC_A and the main power switch detection signal 220 are input to the FET 223. The control unit A 260 having received the power VCC_A changes the remote signals 1 (221) and 2 (222) to a high level. By changing the remote signal 2 (222) to the high level, the control unit A (260) drives first, second, and third relay driving transistors 208, 209, and 210. Consequently, the first, second, and third relays 205, 206, and 207 are turned on, and AC power is supplied to the second and third DC power sources 202 and 203. Further, the control unit A 260 changes the remote signal 1 (221) to the high level. Details of the remote signal 1 will be described below.

The second DC power source 202 to which the AC power is supplied generates power VCC_B and supplies the power VCC_B to the control unit A 260. When the power VCC_B is supplied to the control unit A 260, the control unit A 260 starts controlling the HDD 331. Further, the third DC power source 203 to which the AC power is supplied outputs power VCC_C. The third DC power source 203 supplies the power VCC_C to the control unit B 270. The control unit B 270 to which the power VCC_C is supplied is changed to a state in which the control unit B 270 is capable of controlling the conveying motor 441, the high-voltage power source 442, etc.

If the main power switch 204 is turned on, the second DC power sources 202 starts outputting the power VCC_B, and the third DC power source 203 starts outputting the power VCC_C. Specifically, the power mode of the image forming apparatus 350 is changed from the power off mode to the normal mode in which an image formation operation is executable. In other words, the image forming apparatus 350 is changed to the state in which the image forming apparatus 350 stands by for a start of image formation.

(Description of Time when Power-Saving Switch is Pressed)

Next, the following describes operations performed when a power saving switch 332 is pressed while the image forming apparatus 350 is operating in the normal mode. If the power saving switch 332 is pressed, the control unit A 260 changes the remote signal 2 (222) to the low level as illustrated in FIG. 8. If the remote signal 2 (222) is changed to the low level, the first, second, and third relay driving transistors 208, 209, and 210 stop driving. Consequently, the first, second, and third relays 205, 206, and 207 are turned off, and the supply of AC power to the second and third DC power sources 202 and 203 is stopped. At this time, the image forming apparatus 350 is changed to a power saving mode (second power mode) in which power consumption is lower than power consumption in the normal mode.

In the present exemplary embodiment, the power saving mode (second power mode) is a mode in which the power consumption is lower than the power consumption in the normal mode (first power mode), and the supply of power to at least the fixing device 500 and the control unit B 270 is stopped.

If the power saving switch 332 is pressed while the image forming apparatus 350 is operating in the power saving mode, the control unit A 260 changes the remote signal 2 (222) to the high level as illustrated in FIG. 8. If the remote signal 2 (222) is changed to the high level, the first, second, and third relay driving transistors 208, 209, and 210 are driven. Consequently, the first, second, and third relays 205, 206, and 207 are turned on, and AC power is supplied to the second and third DC power sources 202 and 203. At this time, the power mode of the image forming apparatus 350 is changed to the normal mode, and the image forming apparatus 350 is ready to perform image formation operations.

As described above, if the power saving switch 332 is pressed, the supply of AC power to the second and third DC power sources 202 and 203 is controlled according to the power mode of the image forming apparatus 350 to realize the power saving mode in which the power consumption of the entire apparatus is low.

(Description of Time when Main Power Switch is Turned Off)

The following describes operations performed when the main power switch 204 is turned off. If the main power switch 204 is turned off, the supply of power VCC_A is blocked, and the main power switch detection signal 220 is changed to the low level. At this time, the remote signal 1 (221) is the high level, so the supply of power VCC_A to the control unit A 260 is continued, and power is supplied to the second and third DC power sources 202 and 203. If the control unit A 260 detects the main power switch detection signal 220 as being the low level, the control unit A 260 performs shutdown processing to turn off the image forming apparatus 350. The shutdown processing refers to processing that the control unit A 260 and the control unit B 270 need to perform to stop the operation of the image forming apparatus 350 (e.g., processing of saving data on the HDD, etc.). After performing the shutdown processing, the control unit A 260 changes the remote signal 2 (222) to the low level. Consequently, the power VCC_B and the power VCC_C are blocked. Thereafter, the control unit A 260 changes the remote signal 1 (221) to the low level to block the power VCC_A supplied to the control unit A 260. In this way, when the main power switch 204 is turned off, the supply of power VCC_A and power VCC_B to the control unit A 260 and the supply of power VCC_C to the control unit B 270 are stopped so that no power is supplied to the entire apparatus.

(Configuration of Control Unit)

Figure 3:
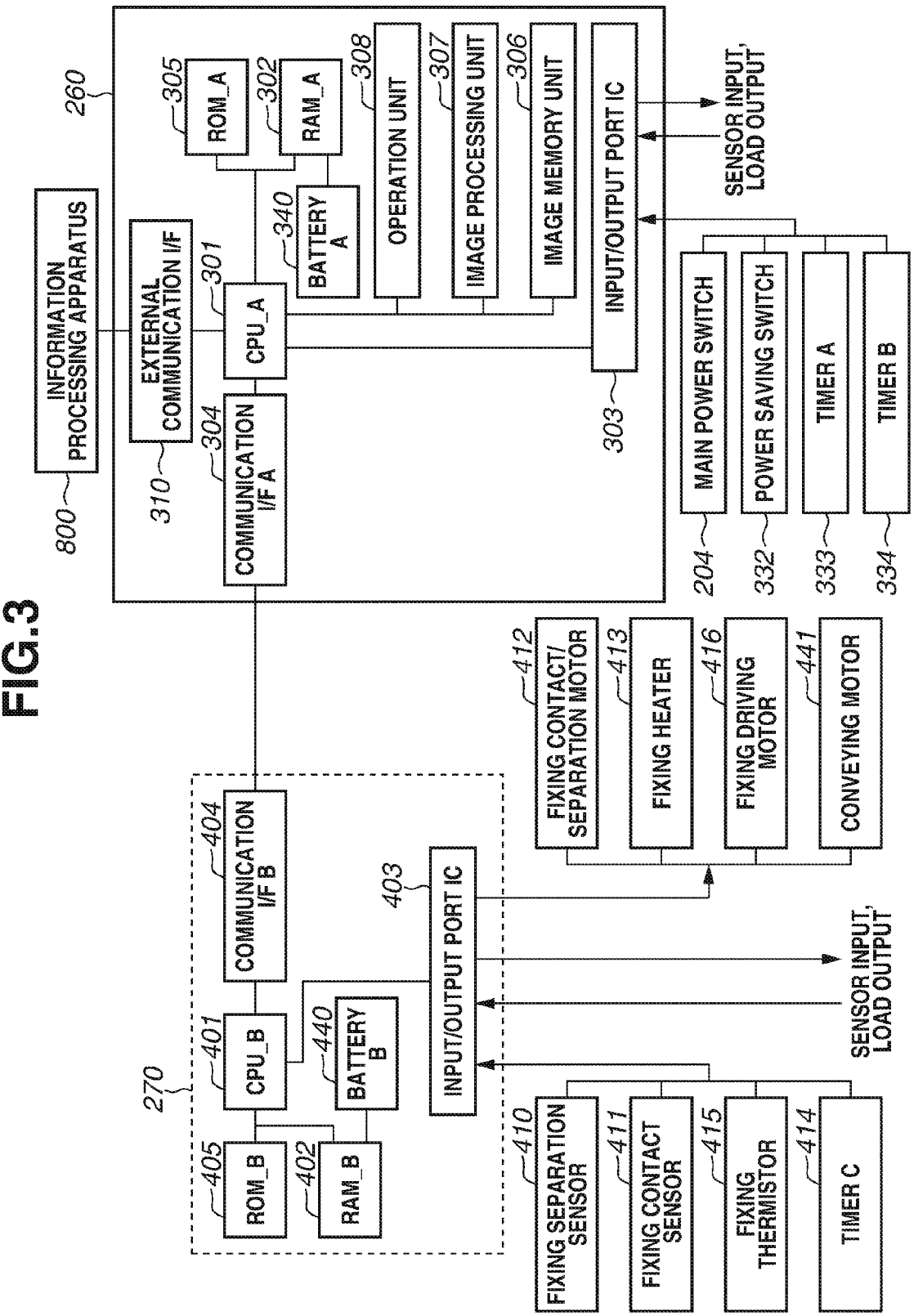
FIG. 3 illustrates a hardware configuration of the image forming apparatus.

FIG. 3 illustrates a hardware configuration of the image forming apparatus 350 and a communication/connection relationship between the control unit A 260 and the control unit B 270.

The control unit A 260 includes a central processing unit (CPU)_A 301, a read-only memory (ROM)_A 305, and a random access memory (RAM)_A 302. The control unit A 260 further includes an input/output port IC 303, a communication interface A 304, an external communication interface 310, an image memory unit 306, an image processing unit 307, an operation unit 308, and a battery A 340. The CPU_A 301 executes a control program stored in the ROM_A 305 and controls the image forming apparatus 350 according to signals received via the input/output port IC 303 from a timer A 333, a timer B 334, the main power switch 204, and the power saving switch 332. The ROM_A 305 is a non-volatile memory which stores programs for executing processes illustrated in flow charts described below. The RAM_A 302 is a main storage memory used as a work area for executing the processing of the control program.

The input/output port IC 303 is a port for receiving the signals from the main power switch 204, the power saving switch 332, the timer A 333, and the timer B 334. The input/output port IC 303 is connected to the CPU_A 301 via an address bus and a data bus. The communication interface A 304 is an interface for data communication between the control unit A 260 and the control unit B 270. The external communication interface 310 is an interface for data communication between the control unit A 260 and an information processing apparatus 800. The control unit A 260 transmits and receives necessary control data for image formation to and from the control unit B 270 via the communication interface A 304 and the external communication interface 310. The battery A 340 is connected to the RAM_A 302. Thus, even if the image forming apparatus 350 is turned off, data stored in the RAM_A 302 is retained. The image memory unit 306 is a storage device for storing image data transferred from the information processing apparatus 800. The image processing unit 307 executes various types of image processing on image data read from the image memory unit 306.

The CPU_A 301 is connected to the operation unit 308. The CPU_A 301 receives user instructions via the operation unit 308. Examples of user instructions include an instruction to form an image, an instruction to change the operation mode of the printer unit 10, and an instruction to change the display of the operation unit 308. Further, the CPU_A 301 is capable of performing display control such that a display unit of the operation unit 308 displays an operation state of the printer unit 10 and an operation mode set by key input.

The control unit A 260 is connected to the information processing apparatus 800 via the external communication interface 310. The CPU_A 301 stores in the image memory unit 306 image data transferred from the information processing apparatus 800, causes the image processing unit 307 to perform image processing, and performs processing relating to the configuration of an image forming system.

The control unit B 270 includes a CPU_B 401, a ROM_B 405, and a RAM_B 402. The control unit B 270 further includes an input/output port IC 403, a communication interface B 404, and a battery B 440.

The CPU_B 401 executes a control program stored in the ROM_B 405 to control image formation performed by the printer unit 10. Specifically, the CPU_B 401 receives sensor signals from a fixing separation sensor 410, a fixing contact sensor 411, and a fixing thermistor 415 and signals from the timer C 414 input via the input/output port IC 403. Then, based on the sensor signals, the CPU_B 401 outputs control signals with respect to various loads such as the conveying motor 441, a fixing contact/separation motor 412, a fixing heater 413, and a fixing driving motor 416. In this way, the CPU_B 401 controls the conveying of sheets, the forming of images on sheets, the fixing of toner, etc. The fixing driving motor 416 may be configured to rotate the first rotary member and the second rotary member. The fixing driving motor may include an execution unit (drive controller) that executes a rotation operation based upon a signal from one or more processors such as CPU_B 401 which may also act as an execution unit. The fixing contact/separation motor 412 may be configured to execute a separation operation or execute a contact operation of the first rotary member and the second rotary member. The fixing contact/separation motor 412 may also include its own execution unit (drive controller) that executes contact/separation operations based upon a signal from one or more processors such as CPU_B 401 which may also act as an execution unit.

The battery B 440 is connected to the RAM_B 402, and data stored in the RAM_B 402 is retained even if the printer unit 10 is turned off. The input/output port IC 403 is connected to the CPU_B 401 via an address bus and a data bus.

(Contact/Separation Mechanism of Fixing Device)

Figure 4:
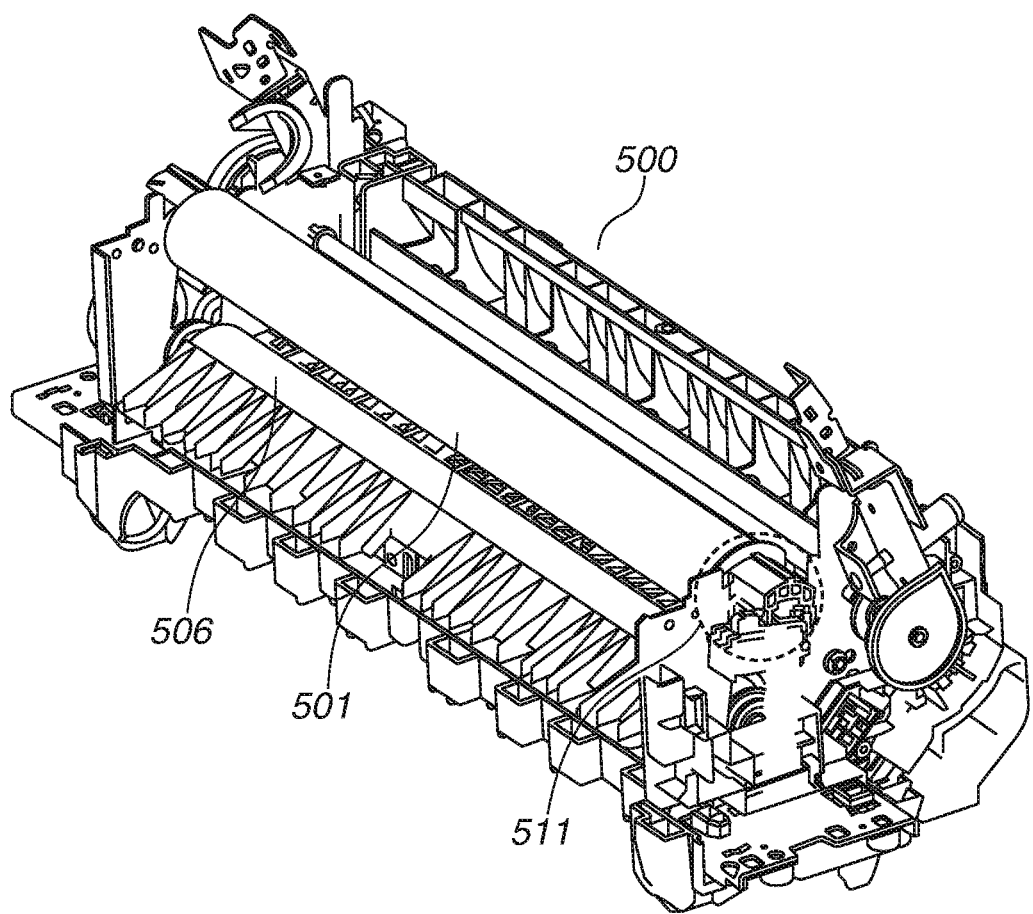
FIG. 4 is a perspective view illustrating a fixing device.

FIG. 4 is a perspective view illustrating the fixing device 500 using a film heating method and a pressing roller method. The fixing device 500 includes a fixing film 501 and a ceramic heater (not illustrated). The fixing film 501 includes a cylindrical thin-metal substrate layer and an elastic layer formed on the cylindrical thin-metal substrate layer.

Figure 5A:
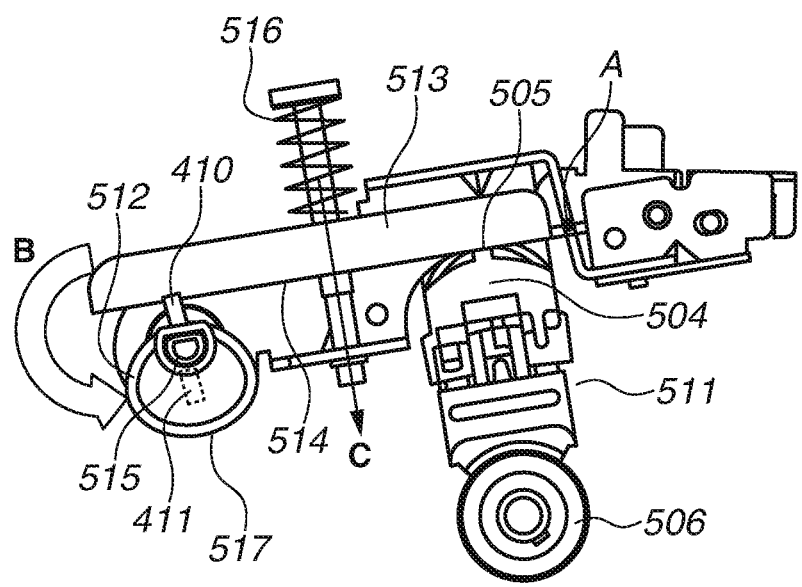
FIGS. 5A-B illustrate a mechanism for bringing a fixing film unit and a pressing roller into contact with each other, and for separating the fixing film unit and the pressing roller from each other.

The following describes a state in which the fixing film unit 511, which is an example of the first rotary member, is in contact with the pressing roller 506, which is an example of the second rotary member, with reference to FIG. 5A. FIG. 5A is a cross sectional view illustrating the fixing device 500 viewed from a thrust direction of the fixing film 501. In FIG. 5A, a pressing plate 513 is supported such that the pressing plate 513 is rotatable about a supporting point A in the direction of an arrow B, and force is applied to the pressing plate 513 in the direction of an arrow C by a pressing spring 516, which is a compression spring. Due to the pressing force (spring force) of the pressing spring 516, force from a surface 514 of the pressing plate 513 is applied to a surface 505 of a fixing flange 504 to bring the fixing film unit 511, which is the first rotary member, into contact with the pressing roller 506, which is the second rotary member. A cam 512 is engaged with and held by a pressure releasing shaft 515, which is rotatably attached. In this contact state, a cam surface 517 of the cam 512 does not touch the surface 514 of the pressing plate 513.

Figure 5B:
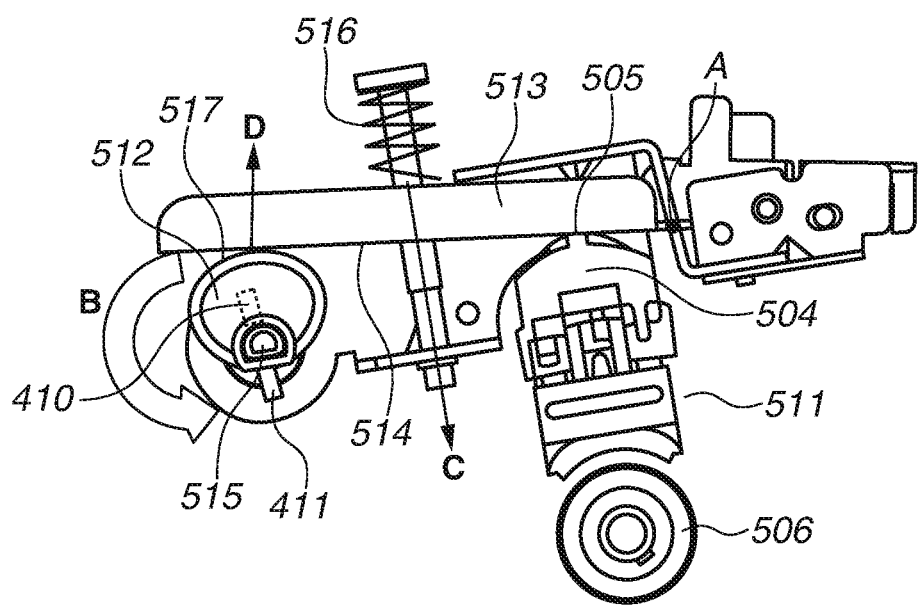

The following describes a state in which the fixing film unit 511 and the pressing roller 506 are separated from each other, with reference to FIG. 5B. FIG. 5B is a cross sectional view illustrating the fixing device 500 viewed from the thrust direction of the fixing film 501, as in FIG. 5A. The state illustrated in FIG. 5B is different from the contact state illustrated in FIG. 5A in that the cam 512 is rotated about the pressure releasing shaft 515 in the direction of the arrow B such that the surface 514 of the pressing plate 513 is pushed upward in a direction D by the cam surface 517 of the cam 512. The cam surface 517 of the cam 512 receives the spring force from the pressing spring 516 so that the spring force from the pressing spring 516 is not applied to the fixing flange 504 to separate the fixing film unit 511 and the pressing roller 506 from each other.

(Flow Charts of Fixing Contact/Separation Operations)

Figure 6:
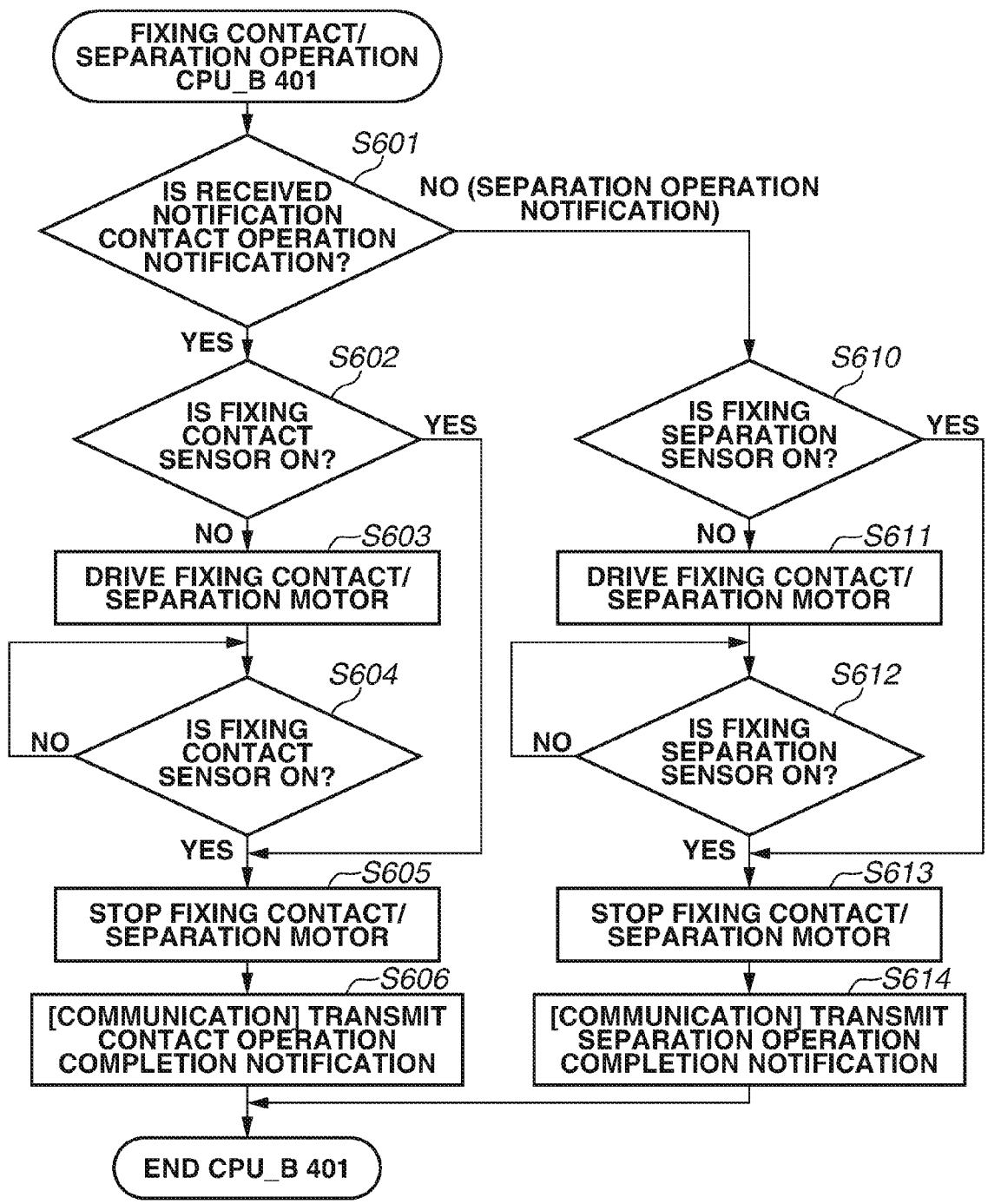
FIG. 6 is a flow chart illustrating contact/separation control performed by a CPU_B.

FIG. 6 is a flow chart illustrating an operation of bringing the fixing film unit 511 and the pressing roller 506 into contact with each other and an operation of separating the fixing film unit 511 and the pressing roller 506 from each other. Each step illustrated in the flow chart is executed by the CPU_B 401, and the process illustrated in the flow chart is started when a contact operation notification or separation operation notification is received from the CPU_A 301.

First, in step S601, the CPU_B 401 determines whether the notification received from the CPU_A 301 is a contact operation notification. If the CPU_B 401 determines that the received notification is a contact operation notification (YES in step S601), then in step S602, the CPU_B 401 detects the state of the fixing contact sensor 411 of the fixing device 500. If the fixing contact sensor 411 is on (YES in step S602), the CPU_B 401 determines that the fixing film unit 511 and the pressing roller 506 are already in contact with each other, and the processing proceeds to step S605. On the other hand, if the fixing contact sensor 411 is off (NO in step S602), then in step S603, the CPU_B 401 drives the fixing contact/separation motor 412. In step S604, the CPU_B 401 waits until the fixing contact sensor 411 is turned on. If the fixing contact sensor 411 is turned on (YES in step S604), the CPU_B 401 determines that the fixing film unit 511 and the pressing roller 506 are in contact with each other, and in step S605, the CPU_B 401 stops the fixing contact/separation motor 412. Then, in step S606, the CPU_B 401 transmits a contact operation completion notification to the CPU_A 301. After the notification of completion of contact operation, the process illustrated in the flow chart in FIG. 6 is ended.

On the other hand, in step S601, if the CPU_B 401 determines that the notification received from the CPU_A 301 is not a contact operation notification, i.e., if the CPU_B 401 determines that the notification received from the CPU_A 301 is a separation operation notification (NO in step S601), the processing proceeds to step S610. In step S610, the CPU_B 401 detects the state of the fixing separation sensor 410. If the fixing separation sensor 410 is on (YES in step S610), the CPU_B 401 determines that the fixing film unit 511 and the pressing roller 506 are already separated from each other, and the processing proceeds to step S613. On the other hand, if the fixing separation sensor 410 is off (NO in step S610), then in step S611, the CPU_B 401 drives the fixing contact/separation motor 412. In step S612, the CPU_B 401 waits until the fixing separation sensor 410 is turned on. If the fixing separation sensor 410 is turned on (YES in step S612), the CPU_B 401 determines that the fixing film unit 511 and the pressing roller 506 are separated from each other, and in step S613, the CPU_B 401 stops the fixing contact/separation motor 412. Then, in step S614, the CPU_B 401 transmits a separation operation completion notification to the CPU_A 301. After the notification of completion of separation operation, the process illustrated in the flow chart in FIG. 6 is ended.

(Power Mode Setting of Image Forming Apparatus 350)

Figure 7:
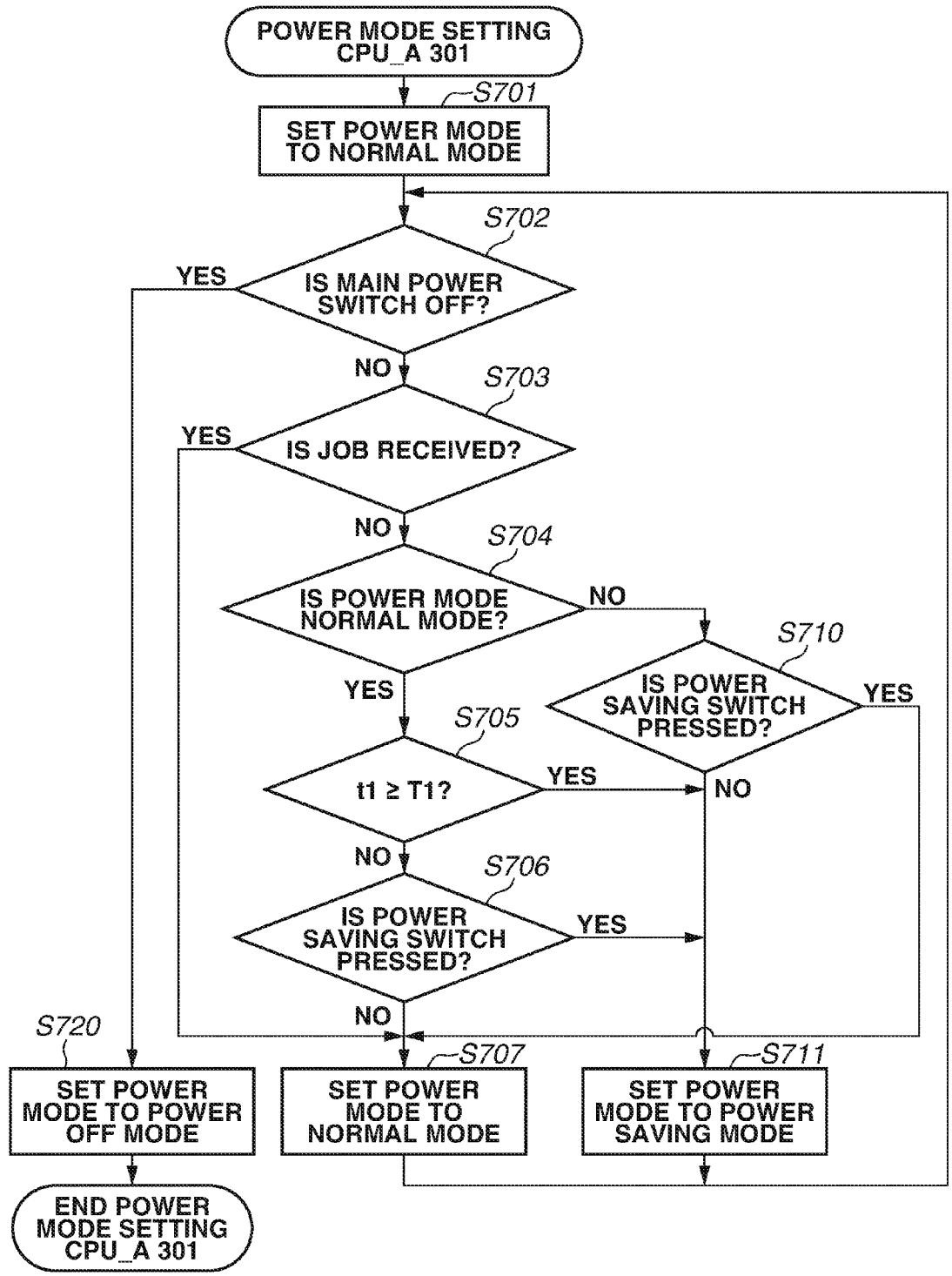
FIG. 7 is a flow chart illustrating a process of setting a power mode by a CPU_A.

FIG. 7 is a flow chart illustrating a process of setting the power mode of the image forming apparatus 350. The following describes a transition of the power mode when the main power switch 204 or the power saving switch 332 is operated by a user or when job data is received, with reference to FIG. 7. The process illustrated in the flow chart is executed by the CPU_A 301. The process is started immediately after the image forming apparatus 350 is turned on, and is continued to operate until the image forming apparatus 350 is turned off.

In step S701, the CPU_A 301 sets the normal mode as power mode information which indicates the power mode at the time point immediately after the power is turned on. The power mode is stored in "mode" allocated in the RAM_A 302.

In step S702, the CPU_A 301 determines whether the main power switch 204 is off based on the main power switch detection signal 220. If the main power switch 204 is off (YES in step S702), then in step S720, the CPU_A 301 sets the mode in the RAM_A 302 to the power off mode. On the other hand, if the main power switch 204 is not off (NO in step S702), the processing proceeds to step S703.

In step S703, the CPU_A 301 determines whether a job is received. In the present exemplary embodiment, the term "job" refers to an image formation request from the information processing apparatus 800 or the operation unit 308. If a job is received (YES in step S703), then in step S707, the mode remains the normal mode. On the other hand, if no job is received (NO in step S703), the processing proceeds to step S704 to identify the power mode set at this time point.

In step S704, if the CPU_A 301 determines that the mode is the normal mode (YES in step S704), then in step S705, the CPU_A 301 determines whether a time t1 measured by the timer A 333 is equal to or longer than a sleep transition time T1. The time T1 is freely changeable by the user via the operation unit 308 according to an environment in which the image forming apparatus 350 is located. For example, if the user prioritizes the first copy output time (FCOT) over reduction in power consumption, the sleep transition time T1 can be set longer. The sleep transition time T1 can be set up to an infinite time, i.e., the sleep transition time T1 can be set not to change to the power saving mode. In the present exemplary embodiment, the time T1 is set to 10 minutes. A timing at which the timer A 333 starts time measurement is a time point at which the power mode is changed to the normal mode (this will be described below with reference to FIGS. 9A and 9B).

In step S705, if the CPU_A 301 determines that the time t1 measured by the timer A 333 is shorter than the sleep transition time T1 (NO in step S705), then in step S706, the CPU_A 301 determines whether the power saving switch 332 is pressed. If the CPU_A 301 determines that the power saving switch 332 is not pressed (NO in step S706), then in step S707, the mode remains the normal mode. Thereafter, the processing returns to step S702. On the other hand, in step S705, if the CPU_A 301 determines that the time t1 measured by the timer A 333 is equal to or longer than the sleep transition time T1 (YES in step S705), then in step S711, the CPU_A 301 sets the mode in the RAM_A 302 to the power saving mode. Thereafter, the processing returns to step S702. On the other hand, in step S706, if the CPU_A 301 determines that the power saving switch 332 is pressed (YES in step S706), a transition from the normal mode to the power saving mode is requested by the user, so in step S711, the CPU_A 301 sets the mode to the power saving mode. Thereafter, the processing returns to step S702.

On the other hand, in step S704, if the CPU_A 301 determines that the mode is not the normal mode (NO in step S704), i.e., if the CPU_A 301 determines that the mode is the power saving mode, the processing proceeds to step S710. In step S710, the CPU_A 301 determines whether the power saving switch 332 is pressed during the operation in the power saving mode. If the CPU_A 301 determines that the power saving switch 332 is not pressed (NO in step S710), then in step S711, the mode remains the power saving mode. Thereafter, the processing proceeds to step S702. On the other hand, in step S710, if the CPU_A 301 determines that the power saving switch 332 is pressed (YES in step S710), a transition from the power saving mode to the normal mode is requested by the user, so in step S707, the CPU_A 301 sets the mode to the normal mode. Thereafter, the processing returns to step S702.

As described above, the CPU_A 301 constantly monitors the main power switch 204, the power saving switch 332, and the time t1 of the timer A 333 to set the power mode of the image forming apparatus 350.

(Operation of Control Unit a 260 During Normal Mode)

Figure 9:
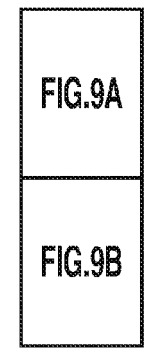
FIGS. 9A and 9B each are a flow chart illustrating control performed by the CPU_A during a normal mode.
Figure 9A:
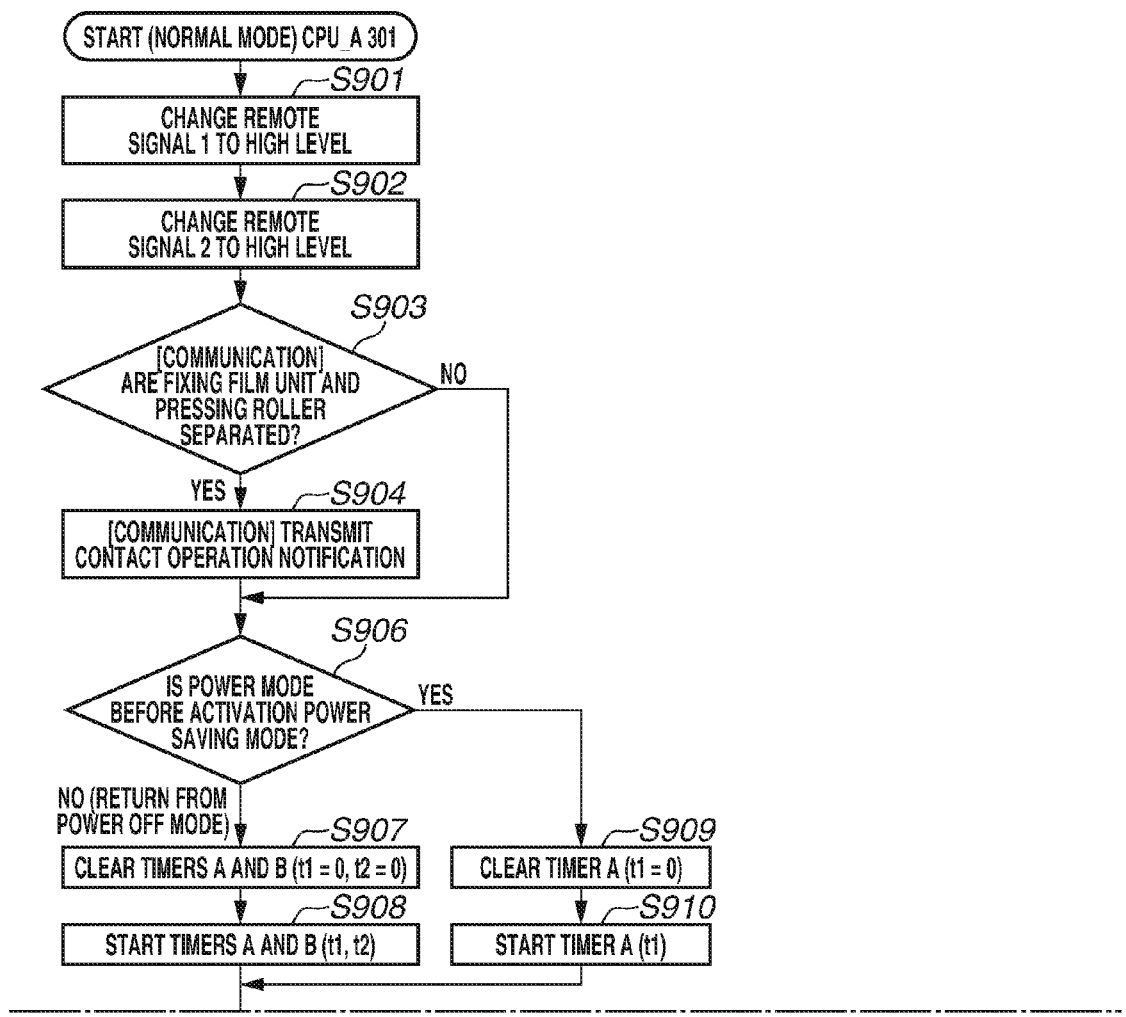
Figure 9B:
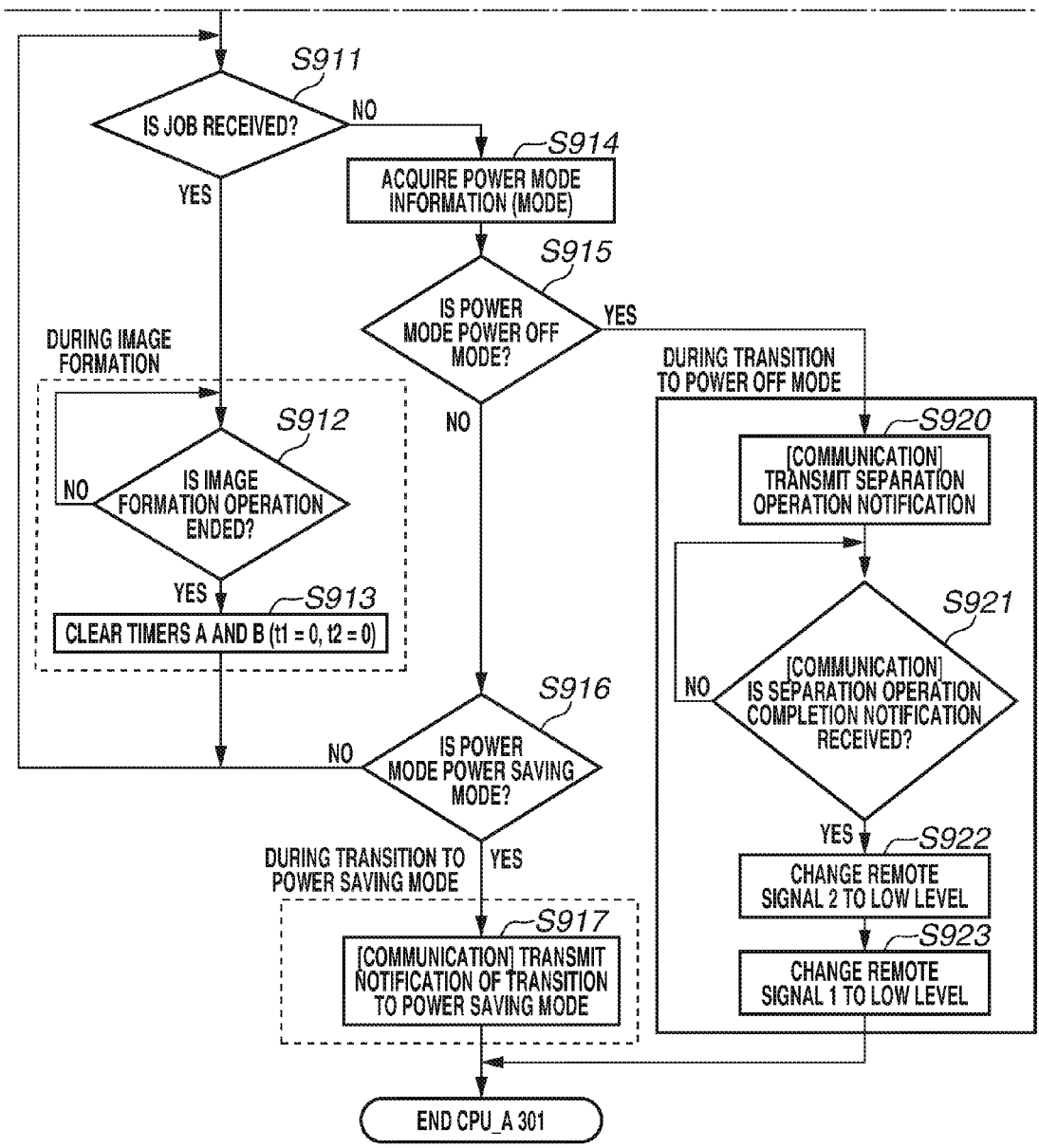

The following describes operations performed when the power mode of the image forming apparatus 350 is the normal mode, with reference to a flow chart illustrated in FIGS. 9A and 9B. The program is started immediately after the power is turned on or the mode is returned from the power saving mode to the normal mode, and is continued to operate until the power mode is changed.

In step S901, the remote signal 1 (221) is changed to the high level. In step S902, the remote signal 2 (222) is changed to the high level. Consequently, the power mode of the image forming apparatus 350 is changed to the normal mode, and the image forming apparatus 350 is ready to perform image formation operations.

Steps S903 and S904 are the processing of bringing the fixing film unit 511 and the pressing roller 506 back into contact with each other. First, in step S903, the CPU_A 301 determines whether the fixing film unit 511 and the pressing roller 506 are separated from each other based on the notification from the CPU_B 401. If the CPU_A 301 determines that the fixing film unit 511 and the pressing roller 506 are separated from each other (YES in step S903), the processing proceeds to step S904. On the other hand, if the CPU_A 301 determines that the fixing film unit 511 and the pressing roller 506 are in contact with each other (NO in step S903), the processing proceeds to step S906. In step S904, the CPU_A 301 transmits a contact operation notification to the CPU_B 401, and the CPU_B 401 having received the contact operation notification controls the operation of bringing the fixing film unit 511 and the pressing roller 506 into contact with each other according to the flow chart illustrated in FIG. 6.

In step S906, the CPU_A 301 checks whether the previous power mode at the time point before the activation is the power saving mode. If the previous power mode is not the power saving mode (NO in step S906), this is the case of return from the power off mode (this is immediately after the power is turned on), so the processing proceeds to step S907.

In step S907, the CPU_A 301 clears the time measured by the timer A 333 (t1=0) and the time measured by the timer B 334 (t2=0). The timer A 333 measures the time of the transition from the normal mode to the power saving mode, as described above. On the other hand, the timer B 334 measures the time that passes since the rotation of at least one of the fixing film unit 511 and the pressing roller 506 is stopped. In step S908, the timer A 333 and the timer B 334 start time measurement.

On the other hand, in step S906, if the previous power mode is the power saving mode (YES in step S906), this is the case of return from the power saving mode to the normal mode, so the processing proceeds to step S909. In step S909, only the time measured by the timer A 333 is cleared (t1=0). The timer B 334 is cleared only when the power mode is changed from the power off mode to the normal mode or when the rotation of at least one of the fixing film unit 511 and the pressing roller 506 is stopped. Thus, in the case in which the power mode is changed from the power saving mode to the normal mode, the above-described clearing condition is not satisfied, so the time measured by the timer B 334 is not cleared. Next, in step S910, the timer A 333 starts time measurement.

In step S911, the CPU_A 301 determines whether a job is received. The determination in step S911 is similar to the determination in step S703. If the CPU_A 301 determines that a job is received (YES in step S911), the processing proceeds to step S912, and the CPU_A 301 instructs the CPU_B 401 to execute image formation operation. The control unit B 270 having received the instruction causes the printer unit 10 to execute the operation described above with reference to FIG. 1.

In step S912, the CPU_A 301 determines whether the image formation operation is ended. This determination is performed based on an image formation operation end notification from the CPU_B 401. If the image formation operation is ended (YES in step S912), the processing proceeds to step S913. Since the image formation operation is ended, it can be determined that the rotation of at least one of the fixing film unit 511 and the pressing roller 506 is stopped. Thus, in step S913, the CPU_A 301 clears the time measured by the timer A 333 (t1=0) and the time measured by the timer B 334 (t2=0), and the processing returns to step S911.

On the other hand, in step S911, if the CPU_A 301 determines that no job is received (NO in step S911), then in step S914, the CPU_A 301 acquires the power mode information (mode) stored in the RAM_A 302. In step S915, the CPU_A 301 determines whether the mode is the power off mode, based on the acquired power mode information. If the mode is not the power off mode (NO in step S915), the processing proceeds to step S916. In step S916, the CPU_A 301 determines whether the power mode is the power saving mode. If the power mode is not the power saving mode (NO in step S916), it can be determined that the power mode is the normal mode. Then, the processing returns to step S911. On the other hand, in step S916, if the CPU_A 301 determines that the power mode is the power saving mode (YES in step S916), then in step S917, the CPU_A 301 transmits to the CPU_B 401 a notification of transition to the power saving mode. After the processing in step S917, the operation in the normal mode is ended, and the operation in the power saving mode is started. The power control in the power saving mode will be described below with reference to FIG. 10.

On the other hand, in step S915, if the CPU_A 301 determines that the power mode is the power off mode (YES in step S915), the processing proceeds to step S920. Steps S920 to S923 are the processing to change to the power off mode in the case in which the main power switch 204 is turned off.

In step S920, the CPU_A 301 transmits a separation operation notification to the CPU_B 401 to start an operation of separating the fixing film unit 511 and the pressing roller 506 from each other. In step S921, the CPU_A 301 waits for a fixing separation operation completion notification from the CPU_B 401 to determine whether to stop the supply of power VCC_C to the control unit B 270. If the CPU_A 301 receives a fixing separation operation completion notification (YES in step S921), the processing proceeds to step S922.

In step S922, the remote signal 2 (222) is changed to the low level. In step S923, the remote signal 1 (221) is changed to the low level. Consequently, the state is changed to the power off state in which no power is supplied to the control unit A 260 and the control unit B 270.

After the processing in step S923, the operation in the normal mode is ended. The above-described process is performed so that when the main power switch 204 is turned off during the normal mode, the supply of DC power is stopped after the separation operation is performed. In this way, a deformation of the fixing nip portion can be prevented even if the fixing nip portion is left for a long time.

(Operation of Control Unit a 260 During Power Saving Mode)

Figure 10:
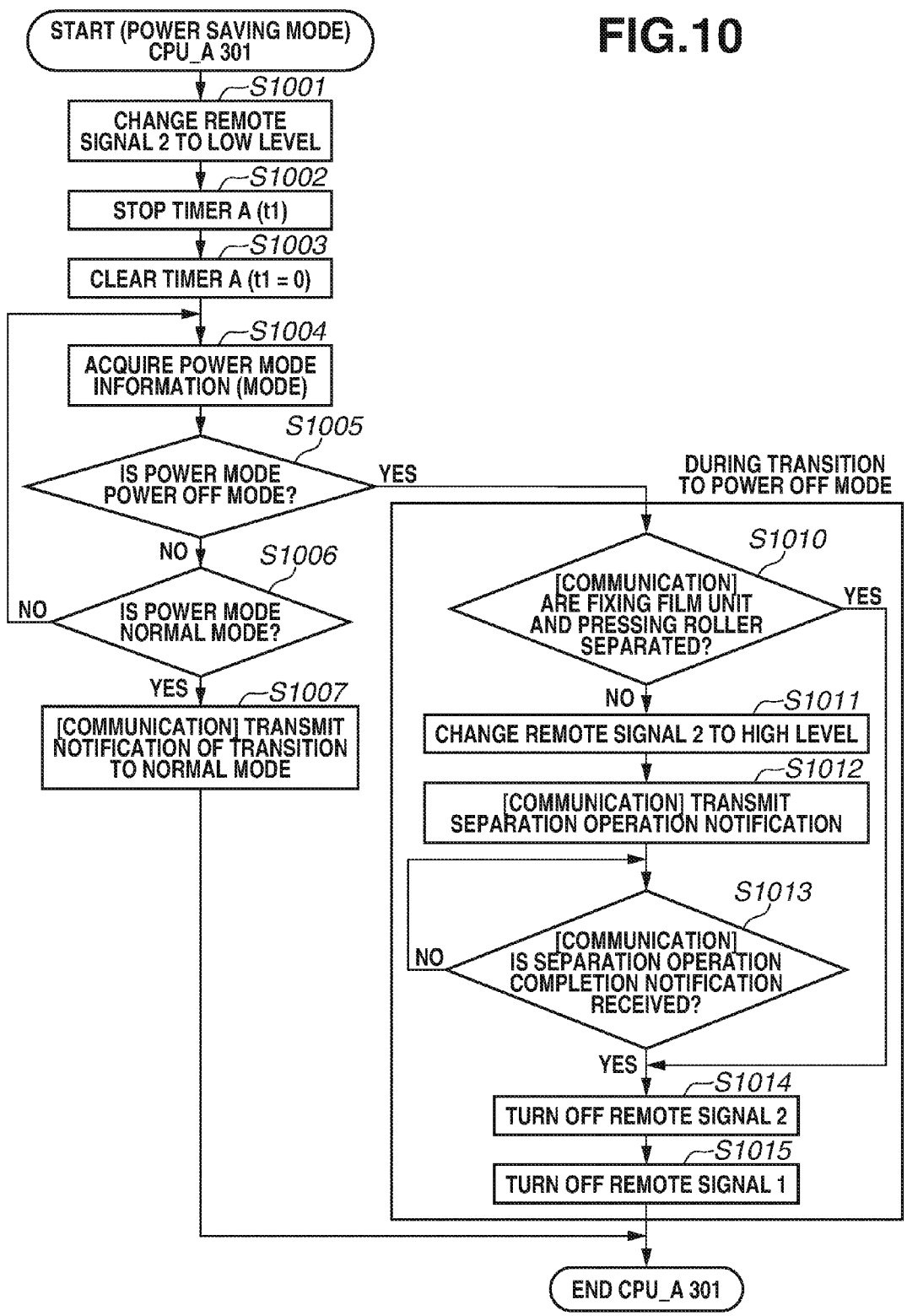
FIG. 10 is a flow chart illustrating control performed by the CPU_A during a power saving mode.

The following describes an operation of changing the power mode when the power mode of the image forming apparatus 350 is the power saving mode, with reference to FIG. 10. The process is started in or after step S917 in FIG. 9B, and the operation continues until the power mode is changed.

In step S1001, the CPU_A 301 changes the remote signal 2 (222) to the low level. Consequently, the image forming apparatus 350 is changed to the power saving state in which power is supplied only to the control unit A 260.

In step S1002, since the power mode is changed to the power saving mode, time measurement by the timer A 333 measuring the time of the transition from the normal mode to the power saving mode is stopped. Then, in step S1003, the time measured by the timer A 333 is cleared (t1=0).

After the processing in step S1003, in step S1004, the CPU_A 301 acquires the power mode information (mode), and in step S1005, the CPU_A 301 determines whether the acquired power mode is the power off mode. If the CPU_A 301 determines that the acquired power mode is not the power off mode (NO in step S1005), the processing proceeds to step S1006. In step S1006, the CPU_A 301 determines whether the acquired power mode is the normal mode. If the CPU_A 301 determines that the acquired power mode is not the normal mode (NO in step S1006), it can be determined that the power mode of the image forming apparatus 350 is continued to be the power saving mode, so the processing returns to step S1004. On the other hand, in step S1006, if the CPU_A 301 determines that the acquired power mode is the normal mode (YES in step S1006), then in step S1007, the CPU_A 301 transmits to the CPU_B 401 a notification of transition of the power mode from the power saving mode to the normal mode. After the processing in step S1007, the operation in the power saving mode is ended, and the operation in the normal mode is started. The control of the normal mode is as described above with reference to FIGS. 9A and 9B.

On the other hand, in step S1005, if the CPU_A 301 determines that the acquired power mode is the power off mode (YES in step S1005), the processing proceeds to step S1010. Steps S1010 to S1015 are the processing to change to the power off mode when the main power switch 204 is turned off during the power saving mode.

In step S1010, the CPU_A 301 transmits to the CPU_B 401 an inquiry about whether the fixing film unit 511 and the pressing roller 506 are separated from each other. If it is confirmed that the fixing film unit 511 and the pressing roller 506 are separated from each other (YES in step S1010), the processing proceeds to step S1014. On the other hand, if the fixing film unit 511 and the pressing roller 506 are in contact with each other (NO in step S1010), the processing proceeds to step S1011.

In step S1011, the remote signal 2 (222) is changed to the high level to operate the fixing contact/separation motor 412 connected to the control unit B 270. In step S1012, the CPU_A 301 transmits to the CPU_B 401 a notification of operation of separating the fixing film unit 511 and the pressing roller 506 from each other. The CPU_B 401 having received the separation operation notification executes the separation operation according to the flow chart in FIG. 6 illustrating the contact/separation control.

In step S1013, a separation operation completion notification from the CPU_B 401 is awaited to determine whether to stop the supply of power VCC_C to the control unit B 270. If a separation operation completion notification is received (YES in step S1013), the processing proceeds to step S1014.

In step S1014, the remote signal 2 (222) is turned off. In step S1015, the remote signal 1 (221) is turned off. Consequently, the state is changed to the power off state in which no power is supplied to the control unit A 260 and the control unit B 270. After the processing in step S1015 is ended, the operation in the power saving mode is ended. The above-described process is performed so that when the main power switch 204 is turned off during the power saving mode, the image forming apparatus 350 is turned off after the operation of separating the fixing film unit 511 and the pressing roller 506 from each other is performed. In this way, a deformation of the fixing nip portion can be prevented even if the fixing nip portion is left for a long time.

(Operation Performed when Time Measured by Timer B 334 Exceeds Time T2)

Figure 11:
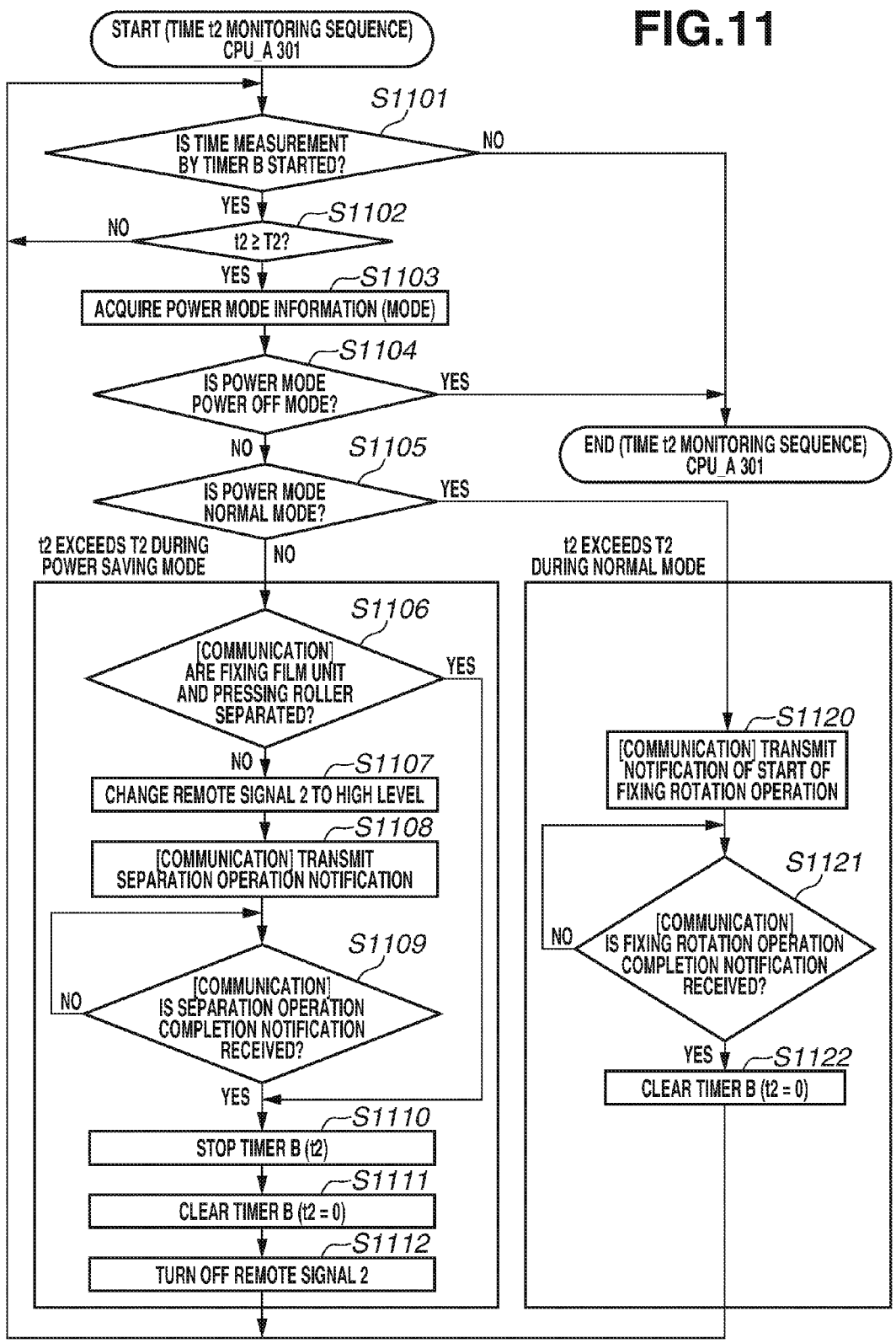
FIG. 11 is a flow chart illustrating control of a monitoring sequence of a time t2 of a timer B by the CPU_A.

Next, the following describes the monitoring processing performed by the CPU_A 301 to monitor the time t2 of the timer B 334, with reference to FIGS. 11 and 12. The time T2 specifies an upper limit time (predetermined time) during which no deformation of the fixing nip portion occurs after the fixing film unit 511 and the pressing roller 506 are brought into contact with each other, and the timer B 334 measures the time t2 which passes. If the time t2 measured by the timer B 334 exceeds the predetermined time T2, the fixing nip portion can be deformed. In the present exemplary embodiment, the predetermined time T2 is set to four hours. The time measurement by the timer B 334 is started at the timing in step S908 in FIG. 9A as described above. Further, the timer B 334 is cleared at the timings in steps S907 and S913 in FIGS. 9A and 9B. The timings are the timing of the transition from the power off mode to the normal mode and the timing of the end of the image formation operation, indicating the timings at which the fixing film unit 511 and the pressing roller 506 being in contact with each other are stopped. Accordingly, if the time t2 measured by the timer B 334 exceeds the time T2, this indicates that the time T2 passes while the fixing film unit 511 and the pressing roller 506 being in contact with each other are stopped.

First, in step S1101 in FIG. 11, the CPU_A 301 monitors the timer B 334 and determines whether time measurement is started by the timer B. If time measurement is started by the timer B 334 (YES in step S1101), the processing proceeds to step S1102. On the other hand, if time measurement is not started by the timer B 334 (NO in step S1101), the CPU_A 301 determines that the fixing film unit 511 and the pressing roller 506 are not in contact with each other, and the process is ended.

In step S1102, the CPU_A 301 determines whether the time t2 measured by the timer B 334 exceeds the upper limit time T2. If the time t2 measured by the timer B 334 does not exceed the upper limit time T2 (NO in step S1102), the processing returns to step S1101 to monitor the timer B 334 until the time t2 becomes equal to or exceeds the time T2.

On the other hand, in step S1102, if the CPU_A 301 determines that the measured time t2 exceeds the upper limit time T2 (YES in step S1102), then in step S1103, the CPU_A 301 acquires the power mode information (mode) stored in the RAM_A 302 and indicating the power mode of the image forming apparatus 350. Then, in step S1104, the CPU_A 301 identifies the power mode at the time point at which the measured time t2 exceeds the upper limit time T2, based on the acquired power mode information (mode). If the CPU_A 301 determines that the power mode is the power off mode (YES in step S1104), since the fixing separation operation start notification is transmitted to the CPU_B 401 in step S920 in FIG. 9B and step S1012 in FIG. 10, the process is ended.

In step S1105, if the CPU_A 301 determines that the power mode is the power saving mode (NO in step S1105), the processing proceeds to step S1106. On the other hand, if the CPU_A 301 determines that the power mode is the normal mode (YES in step S1105), the processing proceeds to step S1120.

Steps S1106 to S1112 are the processing performed when the time t2 of the timer B 334 exceeds the preset time T2 during the power saving mode. In step S1106, the CPU_A 301 determines whether the fixing film unit 511 and the pressing roller 506 are separated from each other. If the fixing film unit 511 and the pressing roller 506 are already separated from each other (YES in step S1106), the processing proceeds to step S1110. On the other hand, if the fixing film unit 511 and the pressing roller 506 are in contact with each other (NO in step S1106), the processing proceeds to step S1107.

In step S1107, the remote signal 2 (222) is changed to the high level to operate the fixing contact/separation motor 412 connected to the control unit B 270.

In step S1108, the CPU_A 301 transmits to the CPU_B 401 a separation operation notification to execute the operation of separating the fixing film unit 511 and the pressing roller 506 from each other. The CPU_B 401 having received the separation operation notification executes the separation operation according to the flow chart in FIG. 6 illustrating the contact/separation control.

In step S1109, the CPU_A 301 waits for a separation operation completion notification from the CPU_B 401 to determine whether to stop the supply of power VCC_C to the control unit B 270. The processing remains in step S1109 until the separation operation completion notification is received from the CPU_B 401, and if the separation operation completion notification is received (YES in step S1109), the processing proceeds to step S1110.

In step S1110, since the fixing film unit 511 and the pressing roller 506 are separated from each other, the CPU_A 301 stops the time measurement by the timer B 334. In step S1111, the time measured by the timer B 334 is cleared (t2=0).

In step S1112, the remote signal 2 (222) is turned off, as illustrated in FIG. 8. Consequently, the power mode is returned to the power saving mode, which is a power saving state in which power is supplied only to the control unit A 260. After the processing in step S1112 is ended, the processing returns to step S1101. The above-described process is performed so that when the time t2 measured by the timer B 334 exceeds the preset time T2 during the power saving mode, the separation operation is performed to separate the fixing film unit 511 and the pressing roller 506 from each other. In this way, a deformation of the fixing nip portion can be prevented even if the fixing nip portion is left for a long time.

Steps S1120 to S1122 are the processing performed by the CPU_A 301 when the time t2 measured by the timer B 334 exceeds the preset upper limit time T2 during the normal mode.

In step S1120, the CPU_A 301 transmits to the CPU_B 401 a notification of start of fixing rotation operation in the fixing device 500. Different control from the control performed in the power saving mode is performed because of the following reason. During the normal mode, job transmission from the information processing apparatus 800 or the operation unit 308 can be input immediately. In such a case, an increase in FCOT is prevented while a deformation of the fixing nip portion is prevented even if the fixing nip portion is left for a long time. If the operation of separating the fixing film unit 511 and the pressing roller 506 from each other is performed as in the power saving mode, the operation of bringing the fixing film unit 511 and the pressing roller 506 into contact with each other needs to be performed again, and FCOT is increased by the time consumed for the operation. Thus, the fixing rotation operation is performed during the normal mode. The CPU_B 401 having received the notification starts the fixing rotation operation according to the flow chart in FIG. 12 illustrating the control of the fixing rotation operation. Details will be described below.

In step S1121, the CPU_A 301 performs confirmation of completion of the fixing rotation operation with respect to the CPU_B 401. The processing remains in step S1121 until the fixing rotation operation completion notification is received from the CPU_B 401. If the completion notification is received (YES in step S1121), the processing proceeds to step S1122.

In step S1122, since the fixing rotation operation in the fixing device 500 is completed, the time measured by the timer B 334 is cleared (t2=0). After the completion of the fixing rotation operation, the fixing film unit 511 and the pressing roller 506 being in contact with each other are stopped, so the time measurement by the timer B 334 is not stopped in order to monitor whether the time T2 passes again thereafter. Thus, after the processing in step S1122 is ended, the processing returns to step S1101, and the time measurement by the timer B 334 is monitored.

Figure 12A:
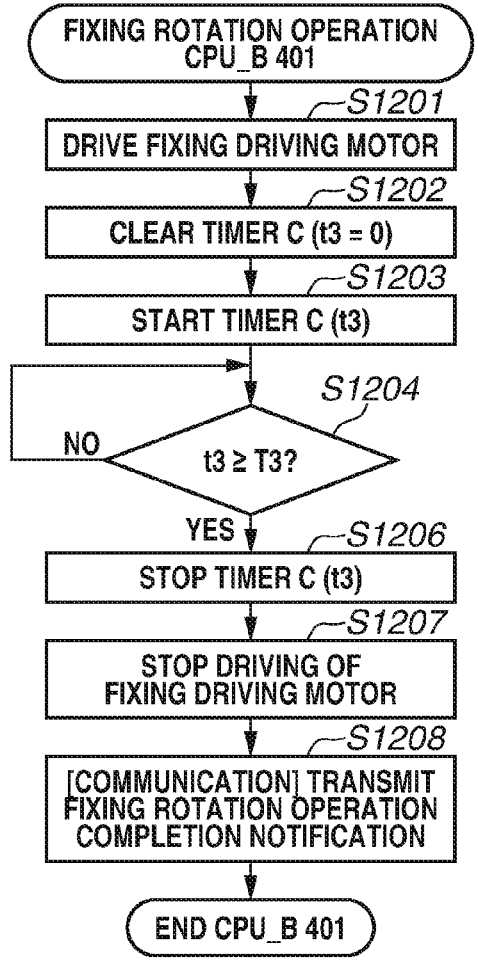
FIGS. 12A and 12B are flow charts each illustrating control of a fixing rotation operation by the CPU_B.

Next, the following describes a flow chart illustrating the control of the fixing rotation operation by the CPU_B 401, with reference to FIG. 12A. FIG. 12A is a flow chart illustrating the control in which only the fixing driving motor 416 is rotated.

First, in step S1201, the CPU_B 401 drives the fixing driving motor 416. In step S1202, immediately after the start of the driving of the fixing driving motor 416, the timer C 414 measuring the rotation time of the fixing driving motor 416 is cleared (t3=0). Next, in step S1203, time measurement by the timer C 414 is started. In step S1204, the CPU_B 401 determines whether the time t3 measured by the timer C 414 is equal to or exceeds a preset time T3. The time T3 is a maximum rotation time of the fixing driving motor 416 and is preset based on verified data. In the present exemplary embodiment, the time T3 is set to 15 seconds. Further, the time T3 can be changeable by the user via the operation unit 308. If the time t3 does not reach the time T3 (NO in step S1204), the processing remains in step S1204. On the other hand, if the time t3 is equal to or exceeds the time T3 (YES in step S1204), the processing proceeds to step S1206. In step S1206, the time measurement by the timer C 414 is stopped. In step S1207, the driving of the fixing driving motor 416 is stopped. Lastly, in step S1208, the CPU_B 401 transmits to the CPU_A 301 a notification of completion of fixing rotation operation, and the process is ended. The above-described arrangement is a mere example, and the present exemplary embodiment is not limited to the arrangement. For example, control of the fixing heater 413 can be performed simultaneously as illustrated in FIG. 12B.

Figure 12B:
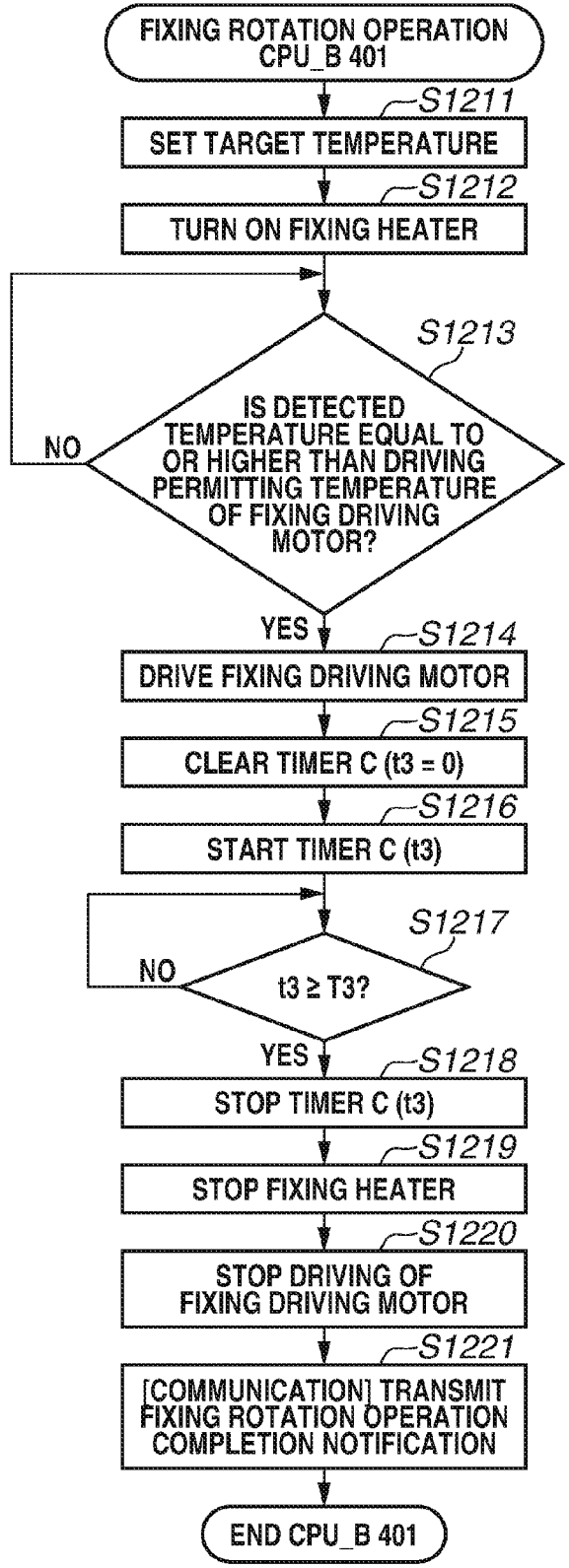

FIG. 12B is a flow chart illustrating the control of the fixing driving motor 416 simultaneously with the control of fixing temperature adjustment of the fixing heater 413. First, in step S1211, the CPU_B 401 sets a target temperature for the fixing temperature adjustment control in the fixing rotation operation. In step S1212, the fixing heater 413 is turned on. In step S1213, the CPU_B 401 determines whether a temperature detected by the fixing thermistor 415 is equal to or higher than a driving permitting temperature of the fixing driving motor 416. This is caused by a mechanical hard mechanism, and a rise in the temperature of the fixing heater 413 to a predetermined temperature or higher enables smooth rotation of the fixing film unit 511 and the pressing roller 506. In step S1213, if the detected temperature is lower than the driving permitting temperature of the fixing driving motor 416 (NO in step S1213), the processing remains in step S1213. On the other hand, if the detected temperature is equal to or higher than the driving permitting temperature of the fixing driving motor 416 (YES in step S1213), the processing proceeds to step S1214. In step S1214, the fixing driving motor 416 is driven. In step S1215, immediately after the start of the driving of the fixing driving motor 416, the timer C 414 measuring the rotation time of the fixing driving motor 416 is cleared (t3=0). Next, in step S1216, time measurement by the timer C 414 is started. In step S1217, the CPU_B 401 checks whether the time t3 of the timer C 414 is equal to or exceeds the preset time T3. If the time t3 does not reach the time T3 (NO in step S1217), the processing remains in step S1217. On the other hand, if the time t3 is equal to or exceeds the time T3 (YES in step S1217), the processing proceeds to step S1218. In step S1218, the time measurement by the timer C 414 is stopped. In step S1219, the fixing heater 413 is stopped. Next, in step S1220, the driving of the fixing driving motor 416 is stopped. Lastly, in step S1221, the CPU_B 401 transmits to the CPU_A 301 a notification of completion of fixing rotation operation, and the process is ended.

Lastly, the following describes an advantage of the present exemplary embodiment with reference to FIGS. 13A and 13B. The image forming apparatus 350 according to the present exemplary embodiment checks that the power mode of the image forming apparatus 350 is the normal mode before performing the operation of separating the fixing film unit 511 and the pressing roller 506 from each other, and performs not the separation operation but the fixing rotation operation. According to a conventional technique, the image formation operation is performed after the operation of bringing the fixing film unit 511 and the pressing roller 506 into contact with each other and the temperature adjustment control of the fixing heater 413 are performed, as illustrated in FIG. 13A. According to the present exemplary embodiment, on the other hand, an increase in FCOT as well as a deformation of the fixing nip portion can be prevented without waiting for the operation of bringing the fixing film unit 511 and the pressing roller 506 into contact with each other, as illustrated in FIG. 13B. If the temperature adjustment control as illustrated in FIG. 12B is simultaneously performed during the fixing rotation operation, an increase in FCOT can be further prevented.

While the example in which whether the power mode of the image forming apparatus 350 at the time point at which the time t2 measured by the timer B exceeds the predetermined time T2 is the normal mode or the power saving mode is determined is described in the present exemplary embodiment, the present invention is not limited to the present exemplary embodiment and is applicable to various exemplary embodiments in which the control of rotation operation or separation operation is executed according to the apparatus state.

Further, while the mode in which power is supplied to all the blocks of the image forming apparatus 350 is described as an example of the first power mode and the mode in which the supply of AC power to the second and third DC power sources 202 and 203 is stopped is described as an example of the second power mode in the present exemplary embodiment, the first and second power modes are not limited to the above-described power modes. For example, the first power mode can be a power mode in which power is supplied to at least the control unit B 270, and the second power mode can be a power mode in which no power is supplied to the control unit B 270. Further, the first power mode can be a power mode in which power is supplied to the control unit A 260, and the second power mode can be a power mode in which no power is supplied to the control unit A 260. Further, the first power mode can be a power mode in which power is supplied to the fixing device 500, and the second power mode can be a power mode in which no power is supplied to the fixing device 500.

Further, while the fixing film unit 511 and the pressing roller 506 are described as examples in the present exemplary embodiment, the present exemplary embodiment is applicable to any rotary member further including a contact/separation mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-115522, filed Jun. 9, 2016, which is hereby incorporated by reference herein in its entirety.

What is claimed is:

1. An image forming apparatus including a first power mode and a second power mode in which power consumption is lower than power consumption in the first power mode, the image forming apparatus comprising:
   an image bearing member;
   an image forming unit configured to form an image on the image bearing member when an image formation request is received;
   a transfer unit configured to transfer onto a sheet the image formed on the image bearing member;
   a fixing unit, including a first rotary member and a second rotary member, fix onto the sheet the image transferred by the transfer unit with a pressing force of the nip portion while applying heat via the first rotary member;
   a first driving unit configured to rotate one of the first rotary member and the second rotary member; and
   a second driving unit configured to bring the first rotary member and the second rotary member into contact with each other to form a nip portion and separate one of the first rotary member and the second rotary member from the other of the first rotary member and the second rotary member; and
   a control unit configured to cause the first driving unit to execute a rotation operation to rotate one of the first rotary member and the second rotary member in a case where a predetermined time passes while the first rotary member and the second rotary member are in contact with each other without rotating and the image forming apparatus is in the first power mode, whereas the control unit causes the second driving unit to execute a separation operation to separate one of the first rotary member and the second rotary member from the other of the first rotary member and the second rotary member in a case where the predetermined time passes while the first rotary member and the second rotary member are in contact with each other without rotating and the image forming apparatus is in the second power mode, wherein during the first power mode, power is supplied to the first driving unit and the second driving unit, and wherein during the second power mode, power is not supplied to the first driving unit and the second driving unit.

2. The image forming apparatus according to claim 1, wherein during the first power mode, power is supplied to at least the fixing unit, and wherein during the second power mode, power is not supplied to the fixing unit.

3. The image forming apparatus according to claim 1, wherein during the first power mode, power is supplied to at least the control unit, and wherein during the second power mode, power is not supplied to the control unit.

4. The image forming apparatus according to claim 1, wherein during the first power mode, a start of image formation is awaited.

5. The image forming apparatus according to claim 1, further comprising a switch which is manually operated by a user, wherein the image forming apparatus returns from the second power mode to the first power mode if the switch is manually operated.

6. The image forming apparatus according to claim 1, wherein the image forming apparatus returns from the second power mode to the first power mode if the image formation request is received.

7. The image forming apparatus according to claim 1, wherein the first rotary member is a fixing film unit, and the second rotary member is a pressing roller.

8. The image forming apparatus according to claim 1, wherein the rotation operation is an operation of rotating the first rotary member and the second rotary member for a second predetermined time without performing image formation.

9. The image forming apparatus according to claim 1, wherein the separation operation is an operation of driving a fixing contact/separation motor to separate the first rotary member and the second rotary member from each other.

10. The image forming apparatus according to claim 1, further comprising a timer configured to measure time during which the first rotary member and the second rotary member are in contact with each other and are not rotated, wherein the control unit determines whether the predetermined time passes while the first rotary member and the second rotary member are in contact with each other without rotating, based on time measured by the timer.

11. The image forming apparatus according to claim 10, wherein the timer starts time measurement if an image formation operation is ended.

12. The image forming apparatus according to claim 10, wherein the timer starts time measurement if at least one of the first rotary member and the second rotary member stops rotating.

13. The image forming apparatus according to claim 10, wherein the timer clears a measured time after at least one of the rotation operation by the first driving unit and the separation operation by the second driving unit is executed, and wherein a second timer clears a second measured time in a case where the image forming apparatus returns from the first power mode to the second power mode.

14. The image forming apparatus according to claim 10, further comprising a second timer configured to measure time from a transition to the second power mode, wherein if time measured by the second timer is greater than or equal to a sleep transition time, the image forming apparatus is changed from the first power mode to the second power mode.

15. The image forming apparatus according to claim 14, wherein the sleep transition time is shorter than the predetermined time.

16. The image forming apparatus according to claim 10, wherein when time measured by the timer is greater than or equal to the predetermined time, the control unit acquires power mode information written to a memory and determines whether a power mode of the image forming apparatus is the first power mode or the second power mode, based on the acquired power mode information.

17. The image forming apparatus according to claim 1, further comprising a reception unit configured to receive the image formation request, wherein in a case where the reception unit receives the image formation request, if the first rotary member and the second rotary member are separated from each other, the second driving unit drives a fixing contact/separation motor to bring the first rotary member and the second rotary member into contact with each other.

18. The image forming apparatus according to claim 1, wherein the control unit causes the second driving unit to execute an operation of driving a fixing contact/separation motor to bring the first rotary member and the second rotary member into contact with each other.

19. An image forming apparatus including a first power mode and a second power mode in which power consumption is lower than power consumption in the first power mode, the image forming apparatus comprising:

an image bearing member;

an image forming unit configured to form an image on the image bearing member when an image formation request is received;

a transfer unit configured to transfer onto a sheet the image formed on the image bearing member;

a fixing unit, including a first rotary member and a second rotary member, fix onto the sheet the image transferred by the transfer unit with a pressing force of the nip portion while applying heat via the first rotary member;

a rotation unit configured to rotate one of the first rotary member and the second rotary member; and a contact/separation unit configured to bring the first rotary member and the second rotary member into contact with each other to form a nip portion and separate one of the first rotary member and the second rotary member from the other of the first rotary member and the second rotary member; and a control unit configured to cause the rotation unit to execute a rotation operation to rotate one of the first rotary member and the second rotary member in a case where a predetermined time passes while the first rotary member and the second rotary member are in contact with each other without rotating and the image forming apparatus is in the first power mode, whereas the control unit causes the contact/separation unit to execute a separation operation to separate one of the first rotary member and the second rotary member from the other of the first rotary member and the second rotary member in a case where the predetermined time passes while the first rotary member and the second rotary member are in contact with each other without rotating and the image forming apparatus is in the second power mode, wherein during the first power mode power is supplied to the rotation unit and the contact/separation unit, and wherein during the second power mode, power is not supplied to the rotation unit and the contact/separation unit.

20. An image forming apparatus including a first power mode and a second power mode in which power consumption is lower than power consumption in the first power mode, the image forming apparatus comprising:

an image bearing member;

an image forming unit configured to form an image on the image bearing member when an image formation request is received;

a transfer unit configured to transfer onto a sheet the image formed on the image bearing member;

a fixing unit, including a first rotary member and a second rotary member, fix onto the sheet the image transferred by the transfer unit with a pressing force of the nip portion while applying heat via the first rotary member;

an execution unit configured to execute:

a rotation operation to rotate one of the first rotary member and the second rotary member; and a separation operation to separate one of the first rotary member and the second rotary member from the other of the first rotary member and the second rotary member; and a control unit configured to cause the execution unit to execute a rotation operation to rotate one of the first rotary member and the second rotary member in a case where a predetermined time passes while the first rotary member and the second rotary member are in contact with each other without rotating and the image forming apparatus is in the first power mode, whereas the control unit causes the execution unit to execute a separation operation to separate one of the first rotary member and the second rotary member from the other of the first rotary member and the second rotary member in a case where the predetermined time passes while the first rotary member and the second rotary member are in contact with each other without rotating and the image forming apparatus is in the second power mode, wherein during the first power mode power is supplied to the execution unit, and wherein during the second power mode, power is not supplied to the execution unit.

* * * * *